(12) United States Patent
Gupta et al.

(10) Patent No.: US 7,483,955 B2
(45) Date of Patent: *Jan. 27, 2009

(54) OBJECT ORIENTED BASED, BUSINESS CLASS METHODOLOGY FOR GENERATING QUASI-STATIC WEB PAGES AT PERIODIC INTERVALS

(75) Inventors: Arun K. Gupta, Easton, CT (US); Rajiv K. Uppal, Trumbull, CT (US); Devang I. Parikh, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/548,032

(22) Filed: Oct. 10, 2006

(65) Prior Publication Data

US 2007/0094326 A1   Apr. 26, 2007

Related U.S. Application Data

(63) Continuation of application No. 09/643,583, filed on Aug. 22, 2000, now Pat. No. 7,171,455.

(51) Int. Cl.
*G06F 15/16* (2006.01)
(52) U.S. Cl. .................. 709/209; 709/203; 709/224; 709/229; 709/235; 709/248; 707/3; 707/10; 717/108
(58) Field of Classification Search .......... 709/203, 709/216–219, 223–228, 246, 235, 248; 707/3, 707/10; 717/106, 108
See application file for complete search history.

(56) References Cited

U.S. PATENT DOCUMENTS 4,367,525 A  1/1983  Brown et al.
4,542,458 A  9/1985  Kitajima et al.

(Continued)

FOREIGN PATENT DOCUMENTS

WO    WO 0133388 A2 *  5/2001

(Continued)

OTHER PUBLICATIONS

Iwona Dubielewicz, et al., "Feasibility Analysis of MDA-based Database Design", (Apr. 7, 2006), *IEEE Proc. of the International Conference of Dependability of Computer Systems (DEPCOS-RELCOMEX'06)*, pp. 1-8.

(Continued)

*Primary Examiner*—Oanh Duong
(74) *Attorney, Agent, or Firm*—Hamilton, Brook, Smith & Reynolds, P.C.

(57) ABSTRACT

A method for providing a requestor with access to dynamic data via quasi-static data requests, comprising the steps of defining a web page, the web page including at least one dynamic element, creating an executable digital code to be run on a computer and invoked at defined intervals by a scheduler component the executable code effective to create and storing a quasi-static copy of the defined web page, creating the scheduler component capable of invoking the executable code at predefined intervals, loading the executable code and the scheduler component onto a platform in connectivity with a web server and with one another, invoking execution of the scheduler component, and retrieving and returning the static copy of the defined web page in response to requests for the defined web page.

9 Claims, 20 Drawing Sheets

U.S. PATENT DOCUMENTS

| | | |
|---|---|---|
| 4,665,478 A | 5/1987 | Hirose et al. |
| 5,257,371 A | 10/1993 | Anezaki |
| 5,265,250 A | 11/1993 | Andrade et al. |
| 5,305,389 A | 4/1994 | Palmer |
| 5,327,559 A | 7/1994 | Priven et al. |
| 5,485,610 A | 1/1996 | Gioielli et al. |
| 5,584,035 A | 12/1996 | Duggan et al. |
| 5,644,770 A | 7/1997 | Burke et al. |
| 5,655,150 A | 8/1997 | Matsumoto et al. |
| 5,675,739 A | 10/1997 | Eilert et al. |
| 5,680,617 A | 10/1997 | Gough et al. |
| 5,692,215 A | 11/1997 | Kutzik et al. |
| 5,694,601 A | 12/1997 | White et al. |
| 5,706,505 A | 1/1998 | Fraley et al. |
| 5,710,920 A | 1/1998 | Maruyama et al. |
| 5,721,900 A | 2/1998 | Banning et al. |
| 5,721,901 A | 2/1998 | Banning et al. |
| 5,721,912 A | 2/1998 | Stepczyk et al. |
| 5,724,556 A | 3/1998 | Souder et al. |
| 5,732,257 A | 3/1998 | Atkinson et al. |
| 5,751,909 A | 5/1998 | Gower |
| 5,758,349 A | 5/1998 | Breslau et al. |
| 5,764,958 A | 6/1998 | Coskun |
| 5,809,266 A | 9/1998 | Touma et al. |
| 5,832,481 A | 11/1998 | Sheffield |
| 5,835,724 A | 11/1998 | Smith |
| 5,835,758 A | 11/1998 | Nochur et al. |
| 5,842,213 A | 11/1998 | Odom et al. |
| 5,848,145 A | 12/1998 | Gallagher et al. |
| 5,850,548 A | 12/1998 | Williams |
| 5,850,631 A | 12/1998 | Golshani et al. |
| 5,864,862 A | 1/1999 | Kriens et al. |
| 5,872,969 A | 2/1999 | Copeland et al. |
| 5,872,971 A | 2/1999 | Knapman et al. |
| 5,884,081 A | 3/1999 | Burbeck |
| 5,892,917 A | 4/1999 | Myerson |
| 5,893,105 A | 4/1999 | MacLennan |
| 5,901,319 A | 5/1999 | Hirst |
| 5,903,897 A | 5/1999 | Carrier, III et al. |
| 5,907,681 A * | 5/1999 | Bates et al. ............... 709/228 |
| 5,907,847 A | 5/1999 | Goldberg |
| 5,911,075 A | 6/1999 | Glaser et al. |
| 5,913,061 A | 6/1999 | Gupta et al. |
| 5,915,253 A | 6/1999 | Christiansen |
| 5,924,109 A | 7/1999 | Ackerman et al. |
| 5,946,682 A | 8/1999 | Wolfe |
| 5,946,694 A | 8/1999 | Copeland et al. |
| 5,956,506 A | 9/1999 | Cobb et al. |
| 5,960,200 A | 9/1999 | Eager et al. |
| 5,961,601 A | 10/1999 | Iyengar |
| 5,964,828 A | 10/1999 | Cummins |
| 5,966,535 A | 10/1999 | Benedikt et al. |
| 5,970,498 A | 10/1999 | Duffield et al. |
| 5,974,443 A | 10/1999 | Jeske |
| 5,978,842 A | 11/1999 | Noble et al. |
| 5,991,535 A | 11/1999 | Fowlow et al. |
| 6,003,037 A | 12/1999 | Kassabgi et al. |
| 6,014,637 A | 1/2000 | Fell et al. |
| 6,038,558 A | 3/2000 | Powers et al. |
| 6,055,522 A | 4/2000 | Krishna et al. |
| 6,061,686 A | 5/2000 | Gauvin et al. |
| 6,076,108 A | 6/2000 | Courts et al. |
| 6,094,662 A | 7/2000 | Hawes |
| 6,098,093 A | 8/2000 | Bayeh et al. |
| 6,108,004 A | 8/2000 | Medl |
| 6,129,274 A | 10/2000 | Suzuki |
| 6,163,878 A | 12/2000 | Kohl |
| 6,185,608 B1 | 2/2001 | Hon et al. |
| 6,225,995 B1 | 5/2001 | Jacobs et al. |
| 6,230,196 B1 | 5/2001 | Guenthner et al. |
| 6,275,858 B1 | 8/2001 | Bates et al. |
| 6,457,047 B1 | 9/2002 | Chandra et al. |
| 6,567,807 B1 * | 5/2003 | Robles et al. ................. 707/10 |
| 6,591,266 B1 | 7/2003 | Li et al. |
| 6,606,525 B1 | 8/2003 | Muthuswamy et al. |
| 6,625,803 B1 * | 9/2003 | Massena et al. ............. 717/100 |
| 6,697,850 B1 * | 2/2004 | Saunders .................... 709/219 |
| 6,701,367 B1 | 3/2004 | Belkin |
| 6,738,901 B1 * | 5/2004 | Boyles et al. ............... 713/159 |
| 6,745,224 B1 * | 6/2004 | D'Souza et al. ............. 709/202 |
| 6,757,708 B1 | 6/2004 | Craig et al. |
| 6,757,900 B1 | 6/2004 | Burd et al. |
| 6,871,211 B2 | 3/2005 | Labounty et al. |
| 6,883,020 B1 * | 4/2005 | Taranto et al. .............. 709/213 |
| 6,883,135 B1 * | 4/2005 | Obata et al. ................. 715/202 |
| 6,898,783 B1 * | 5/2005 | Gupta et al. ................ 717/105 |
| 7,096,418 B1 * | 8/2006 | Singhal et al. .............. 715/205 |
| 2002/0010753 A1 | 1/2002 | Mutsuoka et al. |
| 2002/0116257 A1 | 8/2002 | Helbig |
| 2002/0120710 A1 | 8/2002 | Chintalapati et al. |
| 2003/0018612 A1 | 1/2003 | Melbin |
| 2003/0046365 A1 | 3/2003 | Pfister et al. |
| 2003/0120752 A1 | 6/2003 | Corcoran |
| 2003/0229695 A1 | 12/2003 | McBride |
| 2005/0102273 A1 | 5/2005 | Gupta |
| 2006/0255124 A1 | 11/2006 | Hoch et al. |
| 2007/0244738 A1 | 10/2007 | Chowdhary et al. |

OTHER PUBLICATIONS

Information Business Objects, "Accelerating and Improving Business Analytics," (Apr. 23, 2003), http://www.businessobjects.com/pdf/products/dataintegration/warehouse, pp. 1-4.

Grant A. Jacoby, et al., "Critical Business Requirements Model and Metrics for Intranet Roi", (Feb. 28, 2005) *Journal of Electronic Commerce Research*, vol. 6, No. 1, http://www.csulb.edu/web/journal/jecr/issues, pp. 1-30.

Sugato Bagchi, et al., "Capacity Planning Tools for Web and Grid Environments," (Oct. 1, 2006), *ACM Intern. Proc. Series*, vol. 180, Article No. 256, ACM, NY NY, pp. 1-10.

* cited by examiner

OBJECT ORIENTED BASED, BUSINESS CLASS METHODOLOGY FOR GENERATING QUASI-STATIC WEB PAGES AT PERIODIC INTERVALS

RELATED APPLICATION

This application is a continuation of U.S. application Ser. No. 09/643,583, filed Aug. 22, 2000 now U.S. Pat. No. 7,171,455, the entire teachings of which are incorporated herein by reference.

BACKGROUND OF THE INVENTION (1) Field of the Invention

This invention relates to a method for enhancing the retrieval of dynamic, web-based data, and more particularly to a methodology for generating quasi-static web page versions of dynamic web pages at predefined intervals.

(2) Description of Related Art

With reference to FIG. 15, there is illustrated a typical web server architecture for assembling and delivering web content to a plurality of web browsers as known from the prior art. A plurality of web browsers 1511 are illustrated with each web browser 1511 in connectivity with network router 1515. As used herein, "connectivity" refers to the ability of two entities to exchange electronic information. Network router 1515 is in connectivity with web server component 1517. Web server component 1517 is comprised in part of web server 1519. Each web browser 1511 has access to cached data 1513. Cached data 1513 is data which is transient in nature and is stored in a format accessible to the device which has cached it. Cached data 1513 may reside in local memory, may be stored on a hard drive, or may exist in any format and on any medium capable of storing, retrieving, and sending cached data 1513 as requested by another device. Router 1515 is likewise in connectivity with cached data 1513. When a user requests information from a web server, the retrieved data may be stored for defined periods of time in several places as the requested data makes its way to the requesting web browser 1513.

These temporary storehouses of cached data 1513 serve to minimize the bottlenecks which can form around operational databases in connectivity with web server 1519. For example, many users of web browsers 1511 may request within a short period of time the same web page from a web server 1519. It is not uncommon for the home page of a web site to be static in nature. As used herein, static data is data which does not change over relatively long periods of time. The length of such periods of time varies depending upon the precise nature of the data but is typically on the order of days, weeks, or longer. As users navigate throughout a web site, the choices which a user makes will likely necessitate the creation by the web server 1519 of web pages containing dynamic data. As used herein, dynamic data is data which changes over relatively short periods of time or which cannot be derived prior to a request for such data. The length of such periods of time varies depending upon the precise nature of the data but is typically on the order of minutes or hours. For example, after entering a web site, a user may request data pertaining to a plurality of products of interest. The web page which is assembled and sent to the web browser 1511 by the web server 1519 in response to such a request is formed of a particular set of product information which could not have been ascertained prior to receiving the user's request.

While request for web pages containing dynamic data require interaction with the web server, many requests for web pages involve only static data and may therefore be cached for more effective delivery. Such caching is commonplace in the existing art. For example, a network router 1515 may store in its cached data 1513 every web page which it returns to a web browser 1511 as the result of routing the request to the web server 1519, receiving a response therefrom, and forwarding the response in the form of a web page back to web browser 1511. The length of time for which the network router's 1515 cached data 1513 is to remain resident in memory or otherwise accessible is a system parameter which may be set by the network administrator or other appropriate personnel or application. In this manner, subsequent requests of the network router 1515 by web browsers 1511 to retrieve a web page that has been cached by the network router 1515 may be satisfied by retrieving the web page not from the web server 1519 but from the network router's 1515 cached data 1513. In a similar manner, once a web page has been requested and received by a web browser 1511, the page will typically be stored by the web browser 1511 in cached data 1513 connected to the browser. Subsequent requests by the web browser 1511 for a web page that has been cached may result in the retrieval of the requested web page from cached data 1513 in connectivity with the web browser 1511 rather than being retrieved from the web server 1519.

In this manner, a typical network architecture can minimize the severity of web server 1519 bottlenecks. When a web browser 1511 requests a web page, the web browser 1511 check to see if there is a copy resident in its cached data 1513. If there is, the cached web page is retrieved. If there is not a copy resident in the cached data 1513, the request is passed to the network router 1515. Similarly, the network router 1515 checks to see if it possesses a copy of the requested web page in its cached data 1513. If it does possess a copy, it retrieves the copy and passes it back to web browser 1511. If it does not possess a copy in cached data 1513, it passes the requests on to web server 1519.

At each point in the network where caching takes place, it is possible to designate the period of time during which each copy of cached data 1513 is to remain valid. For example, a web browser 1511 may be configured to allow cached data to remain valid for a period of minutes, for the duration of the current session, or to remain valid in subsequent sessions. Network router 1515 may be configured to maintain cached data 1513 as valid for any desired period. In addition, at any time, a user may select the refresh option on web browser 1511 and force an update from web server 1519 rather from any cached data 1513 version location anywhere throughout the network.

With reference to FIG. 16 there is illustrated a more detailed representation of a typical web server component 1517 as known from the prior art. Web server component 1517 includes an additional methodology by which web pages may be assembled for delivery by a web server 1519. As illustrated, web server component 1517 is additionally comprised of connection 1627, executable 1621, executable repository 1623, and operational database 1625. Connection 1627 comprises the interface which provides connectivity between web server 1519 and network router 1515. Executable 1621 is a self contained application that, when invoked by web server 1519, assembles a web page and sends it to the requesting web browser 1511 via connection 1627. Executable 1621 has access to executable repository 1623 which serves as a memory device in which executable 1621 can store the results of its execution. Operational database 1625 maintains the run-time data of the network architecture. This data may be stored in, but is not limited to, a relational database.

Instead of requesting a web page, a web browser 1511 may instead request the invocation of executable 1621. Executable 1621, when invoked, executes to assemble a web page which matches the request and returns the web page to web browser 1511 via router 1515. One common language in which executable 1621 is written is Active Server Pages or ASP. ASP is an interpreted language which contains static text, such as HTML, as well as ASP commands. Typical ASP commands are delimited by character sequences such as "<%" and "%>". When invoked, the ASP code outputs the static HTML code "as is" to executable repository 1623 while performing the execution of commands written in ASP and appending the results to executable repository 1623. In this manner, an HTML page may be coded in ASP which contains static elements as well as elements which are filled at run time by performing data base accesses from operational database 1625 and the like. While drawn to an ASP implementation, executable 1621 may be written in any language which returns to the requestor information formatted in a appropriate manner.

The present state of the art requires that a web page be either static or dynamic in nature. As a result, a page coded in ASP, dynamic in nature, will often require the invocation of executable 1621 and the attendant access to operational database 1625 in order to fulfill a request for the web page generated by executable 1621. Such database access can result in redundant requests of an operational database the result of which may be slower system response times. However, data which is dynamic is in fact often static over a well defined period of time. For example, product price information may be updated in operational database 1625 on the last day of each month. If a web browser 1511 requests a web page illustrating products and their prices, web browser 1511 would typically invoke ASP code rather than requesting a static web page. This results from the fact that product prices change from time to time. Were the prices unchanging, a static HTML page could be created and stored to be sent to web browsers 1511 in the event of a request for such information. Therefore, any web page which contains dynamic data must be coded in ASP, or a similar language, and will always invoke a retrieval from the operational database 1625.

However, because the dynamic data which records product prices changes quite infrequently, being updated only once a month, it would be desirable to devise a method whereby infrequently changing dynamic data could be handled like static HTML data and stored for immediate retrieval without the necessity of an operational database 1625 query. There is therefore a need in the art to devise a method whereby infrequently changing data contained within a web page can be generated as a static page, in a format such as HTML, rather than as a web page dynamically created by the execution of ASP or other code. Such a methodology would serve to reduce the bottlenecks formed when data is requested which requires interaction with the operational database 1625.

In contrast to existing methodologies whereby ASP or other code is invoked to dynamically create a web page in response to a request, there is needed a methodology whereby the same page, or substantially the same page, could be requested as a static web page thus avoiding unnecessary queries to an operational database. Such a methodology would constitute a substantive change in the manner by which existing methodologies seek to create and return dynamic data in response to user requests.

BRIEF SUMMARY OF THE INVENTION

Accordingly, one aspect of the present invention is drawn to a method for providing a requestor with access to dynamic data via quasi-static data requests, comprising the steps of defining a web page, the web page including at least one dynamic element, creating an executable digital code to be run on a computer and invoked at defined intervals by a scheduler component the executable code effective to create and storing a quasi-static copy of the defined web page, creating the scheduler component capable of invoking the executable code at predefined intervals, loading the executable code and the scheduler component onto a platform in connectivity with a web server and with one another, invoking execution of the scheduler component, and retrieving and returning the static copy of the defined web page in response to requests for the defined web page.

Yet another aspect of the present invention is drawn to the aforementioned method wherein the web page is defined and stored in a centralized repository.

Yet another aspect of the present invention is drawn to the aforementioned method wherein defining the web page comprises the steps of defining the placement and method of derivation for all elements comprising the web page, and defining the web page as either static or dynamic in nature.

Yet another aspect of the present invention is drawn to the aforementioned method wherein the web page is defined as dynamic or static in nature.

Still another aspect of the present invention is drawn to the aforementioned method wherein the creation of the executable code and the creation of the scheduler component is generated from Business Class definitions comprised of the defined web pages.

The method of claim 4 wherein the static copy of the defined page is stored in a format capable of being viewed by a web browser.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

FIG. 10 is a screen rendering of the web page property editor of the present invention showing the form specified attributes.

FIG. 10*a* is a screen rendering of the web property editor of FIG. 10 illustrating the data binding menu.

Like reference numbers and designations in which the various drawings indicate like elements.

DETAILED DESCRIPTION

Figure 1:
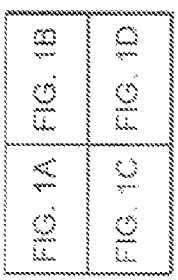
FIG. 1 (formed of FIGS. 1A-1D) is a screen rendering of an Object Modeler GUI in accordance with the invention.
Figure 1A:
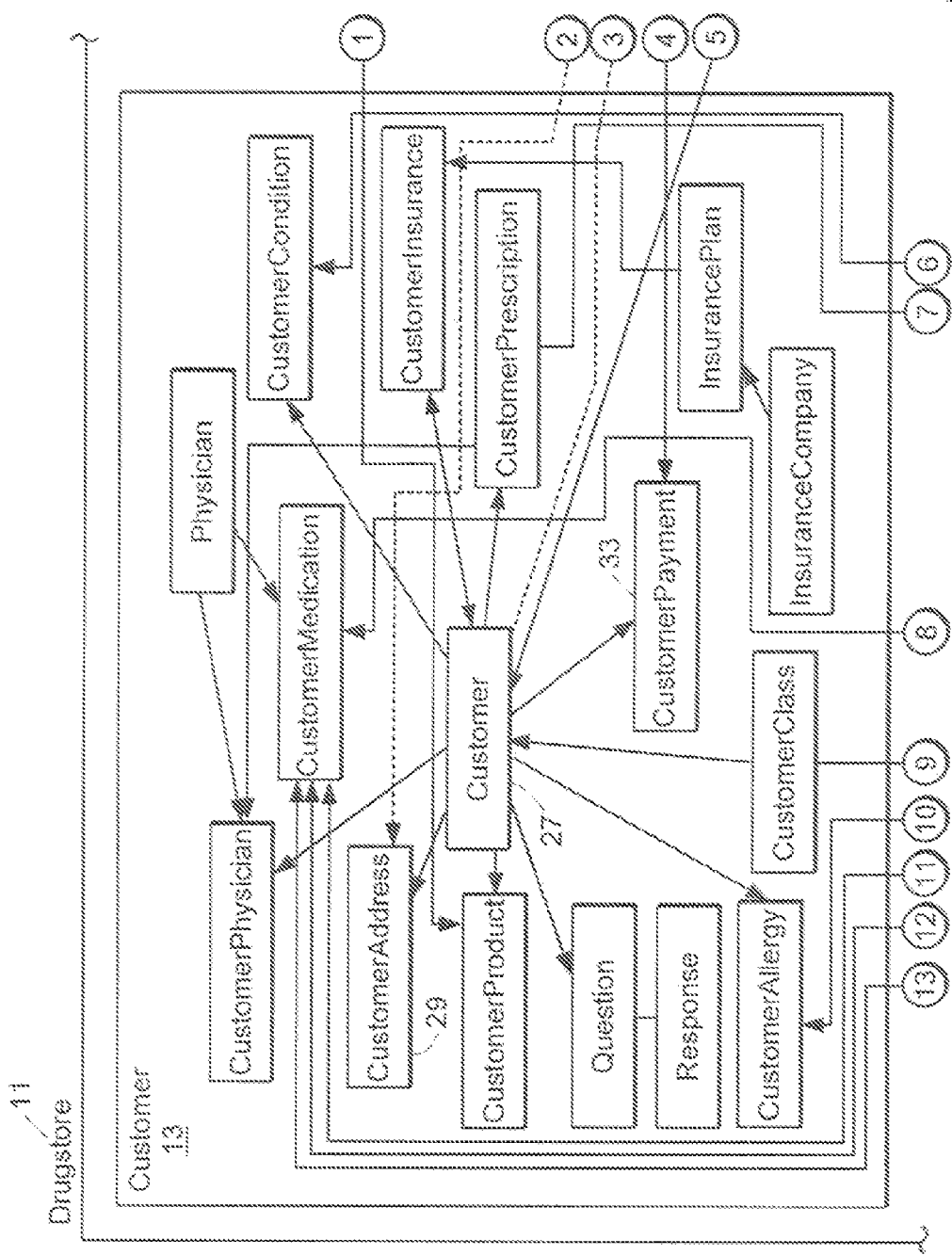
Figure 1B:
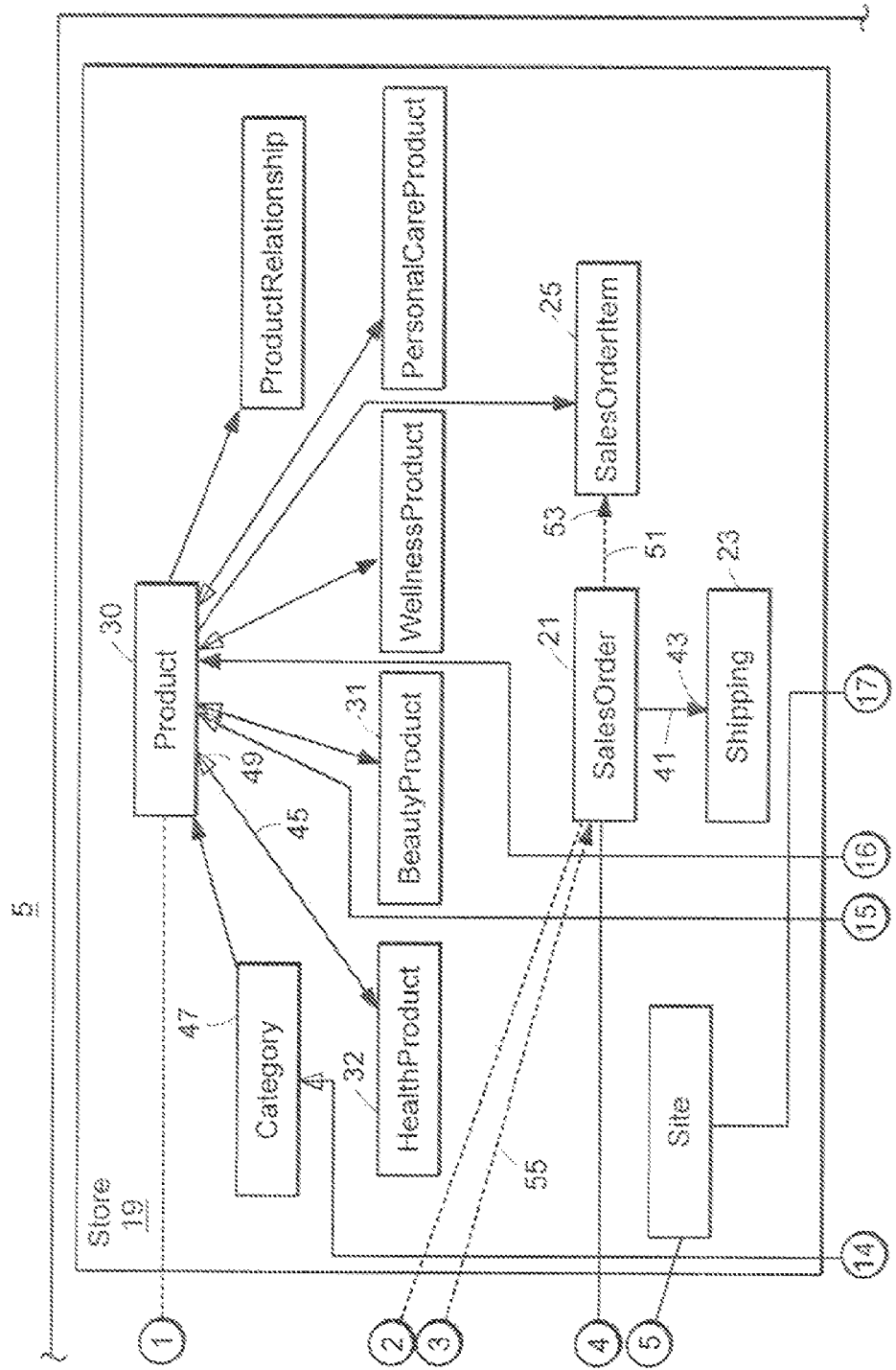
Figure 1C:
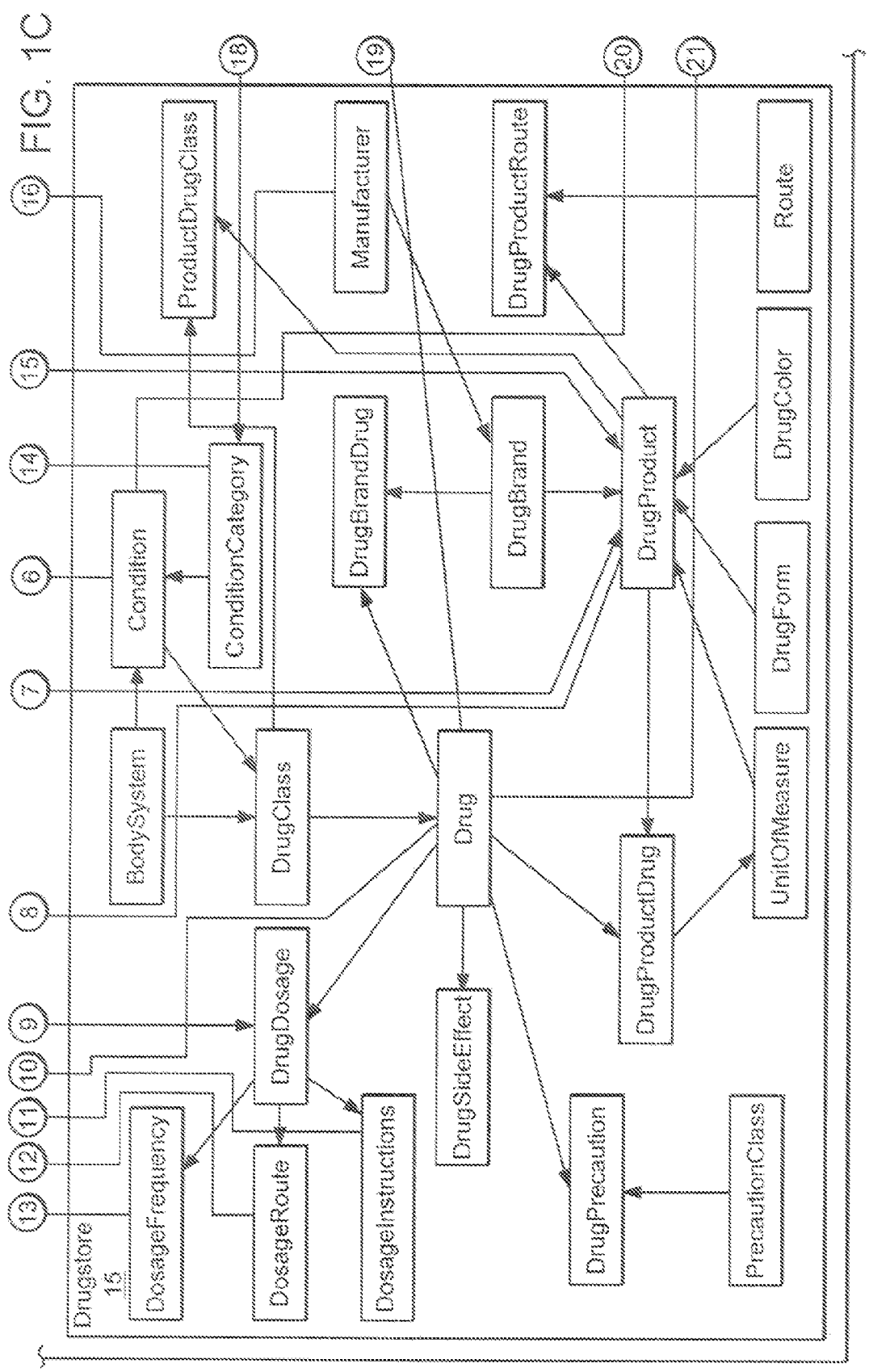
Figure 1D:
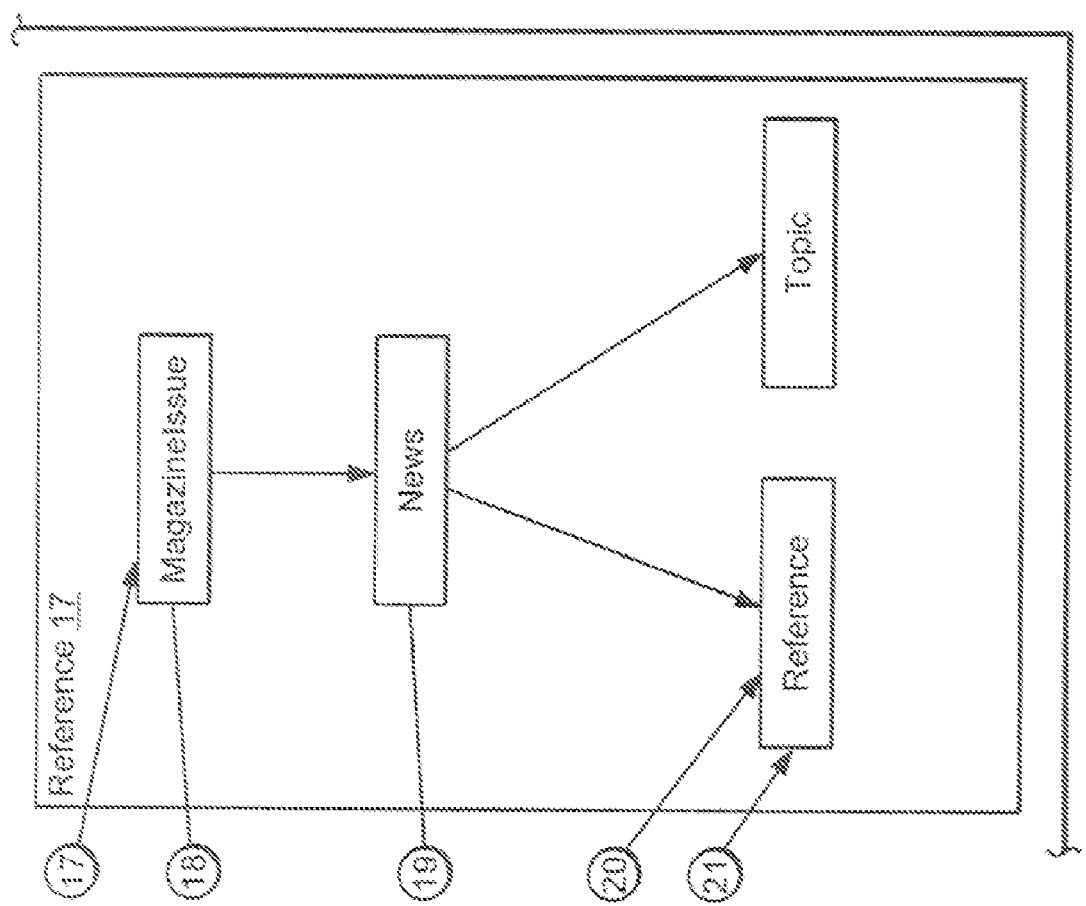

The present invention provides a methodology for converting web pages comprised, in whole or in part of dynamic data, into static HTML coded pages which may be cached as desired throughout a network. As used herein, "web page" refers to code viewable by a web browser. As used herein, "network" refers to an integrated assemblage of electronic components. The result of this conversion is an enhanced methodology whereby requested dynamic data contained in an operational database may be assembled into an equivalent state representation of the requested data which does not require interaction with the operational database 1625 of FIG. 16.

The creation of Web Pages and other means of electronic communication and data manipulation for architected systems is defined through the use of Business Classes as described more fully below.

When executing software on a computer, a Business Object is a data object, for which storage space on an electronic medium has been allocated, derived from a Business Class template. By template, it is meant that a Business Class defines the generic definition of a Business Object. A data object is an entity stored in an electronic format that is comprised of information. A Business Object is, therefore, a dynamically allocated instance of the static Business Class. A Business Class is comprised of attributes, methods, external messages and web documents. Detailed examples of attributes, methods, external messages and web documents are provided below. The Business Processes, comprising in part the Business Class, are themselves comprised of Business Rules, methods, and subprocesses. Business Rules and Business Processes are defined more specifically below. An advantage of the present invention is the ability to model all business activities as interactions between Business Classes.

The structure and organization of the Business Class is such as to uniquely and completely define the attributes of the Business Class. Because the Business Class, when implemented in computer code will often take the form of an OOP class definition, the structure of Business Classes as herein defined bears superficial resemblance to OOP classes. OOP class definitions form the code of various OOP languages including, but not limited to, C++. However, in accordance with the present invention, Business Classes are not limited to implementations in OOP languages, rather Business Classes may be implemented in non-OOP languages including, but not limited to, JAVASCRIPT. Business Class information and definitions are stored in a repository in a neutral format from which code can be generated in any required computer language.

A subset of characteristics unique to a specific Business Class is the relationship between the specific Business Class and a plurality of other Business Classes with which the specific Business Class interacts. Other characteristics of the specific Business Class may include attributes, specific to the Business Class, which are not dependent upon a relationship with other Business Classes.

Described herein are several methodologies involving graphical user interfaces (GUI) which, taken together, allow a user to diagram at a high level of plurality of Business Classes, the relationships between Business Classes, and subcomponents of Business Classes including, but not limited to, Business Processes and Business Rules. While the following detailed descriptions of the methods by which GUIs may be Utilized to perform such diagramming are presented with reference to specific examples, the present invention is not limited to such examples. Rather, the GUI interfaces described herein are intended to broadly encompass any and all graphical means by which a user may interface with a computer, or other electronic device, for the purpose of accomplishing the intended task so described.

As used herein, the term "repository" refers to any aggregation of information whereon data is stored in an electronic format and may be retrieved therefrom. As used herein, "electronic format" refers to any mode of storing or manipulating data in digital form. As used herein, "neutral format" refers to a data format which is capable of being expressed in or converted to at least one other computer language including, but not limited to, object oriented computer languages.

With reference to FIG. 1, there is illustrated a graphical representation of a plurality of Business Classes, their organization, and relationships existing between them. FIG. 1 comprises a Graphical User Interface (GUI) implemented in an Object Modeler 5, through which a user may model any business or process and the attendant operation thereof. Business Classes are grouped to form Subjects. Subjects are combined to form Packages. A Package is utilized to construct a Data Repository on an electronic storage medium. In the present example there is illustrated drugstore 11. Drugstore 11 is a Package comprised of Subjects customer 13, drugstore 15, store 19, reference 17. Each Subject is further comprised of a plurality of Business Classes. A Subject represents a logical grouping of Business Classes.

With continued reference to FIG. 1, store 19 is comprised of a plurality of Business Classes such as Product 30, BeautyProduct 31, HealthProduct 32, SalesOrder 21, Shipping 23, and SalesOrderItem 25. Subject Customer 13 is comprised of, Customer 27, and CustomerAddress 29. Using the GUI interface in a point-and-click manner, a user may define and thereby create Business Classes, drag them on a display device to a desired location, and define the logical relationship between the created Business Class and the other Business Classes. Once created and physically located at a desired point on the display device, the user may define the relationships existing between the Business Class and other Business Classes in a GUI supported manner. For example, SalesOrder 21 was created and placed within store 19. A number of lines either eminating from or terminating at SalesOrder 21, with arrowheads located at least one end of such each line's terminus, designates a relationship between SalesOrder 21 and a plurality of other Business Classes. Specifically, SalesOrder 21 can be seen to exist in relationships with SalesOrderItem 25, Shipping 23, Customer Payment 33, Customer 27, and CustomerAddress 29. One method by which Business Classes and relationships are defined and manipulated through the use of a GUI involves selecting a Business Class object from an object palette, dragging a representation of the Business Class object to a desired location on the user's desktop, and dropping the Business Class object at the location. A palette is a collection of icons from which a user may select a desired icon. Similarly, a relationship might be selected from a relationship palette and applied to a Business Class relationship indicated by a line connecting two Business Classes. The present invention is not limited to any one methodology but is intended to broadly encompass the process of using a GUI to diagram Business Classes and their relationships on a user's desktop. A user's desktop includes, but is not limited to, the portion of a viewing monitor within which an operating systems displays graphical information to a user.

As is indicated by the format of each line and the arrowheads attached thereto, the aforementioned relationships differ in substance from one another. While any method by which the nature of the lines is visually distinguishable by a user, in the present example lines are presented as either solid or dashed with the arrowheads affixed to at least one terminus of each line represented as either solid or unfilled. A solid line indicates a relationship while a dashed line indicates ownership. A solid arrowhead indicates the nature of the derivation of a relationship while an unfilled arrowhead indicates inheritance. These concepts are described more particularly below.

SalesOrder 21 has a relationship with Shipping 23 as evidenced by solid line 41 and solid arrowhead 43. As each sales order must be shipped, there is seen to be a relationship between the two Business Classes. While indicating a relationship, a solid line provides no further indication of the nature of that relationship. In contrast, dashed line 51 between SalesOrder 21 and SalesOrderItem 25 indicates ownership. The orientation of filled arrowhead 53 terminating at SalesOrderItem 25 indicates that each SalesOrder 21 owns a SalesOrderItem 25. Similarly, each SalesOrder 21 owns a CustomerAddress 29. Note that this relationship exists among Business Classes contained in separate Subjects. SalesOrder 21 is a member of store 19 while CustomerAddress 29 is a member of customer 13. Customer 27 is seen to own SalesOrder 21 via dashed line 55. Therefore, a Business class may own another Business Class as well as be owned by a third Business Class. In the present example, Customer 27 owns SalesOrder 21 and SalesOrder 21 owns SalesOrderItem 25. As will be illustrated, an ownership relationship imposes logical implications on software designed and implemented to carry out the tasks modeled in an Object Modeler.

Product 30 is modeled as possessing relationships with a plurality of Business Classes such as BeautyProduct 31 and HealthProduct 32. Unfilled arrowhead 49 at the terminus of solid line 45 connecting HealthProduct 32 and Product 30 indicate inheritance. The location of unfilled arrowhead at Product 30 indicates that Business Class HealthProduct 32 is inherited from, and is thus the child of, parent Business Class Product 30. As such, Product 30 has been defined to be a template for products. The representation of HealthProduct 32 and BeautyProduct 31 as children of Product 30 indicates that HealthProduct 32 and BeautyProduct 31 are specific instances of the more generalized Business Class 30. As such, HealthProduct 32 and BeautyProduct 31 inherit all of the attributes of Product 30. While the user will likely add additional attributes to HealthProduct 32 and BeautyProduct 31 to reflect the unique characteristics of both, both Business Classes will always contain all of the attributes of the parent Product 30.

Figure 2:
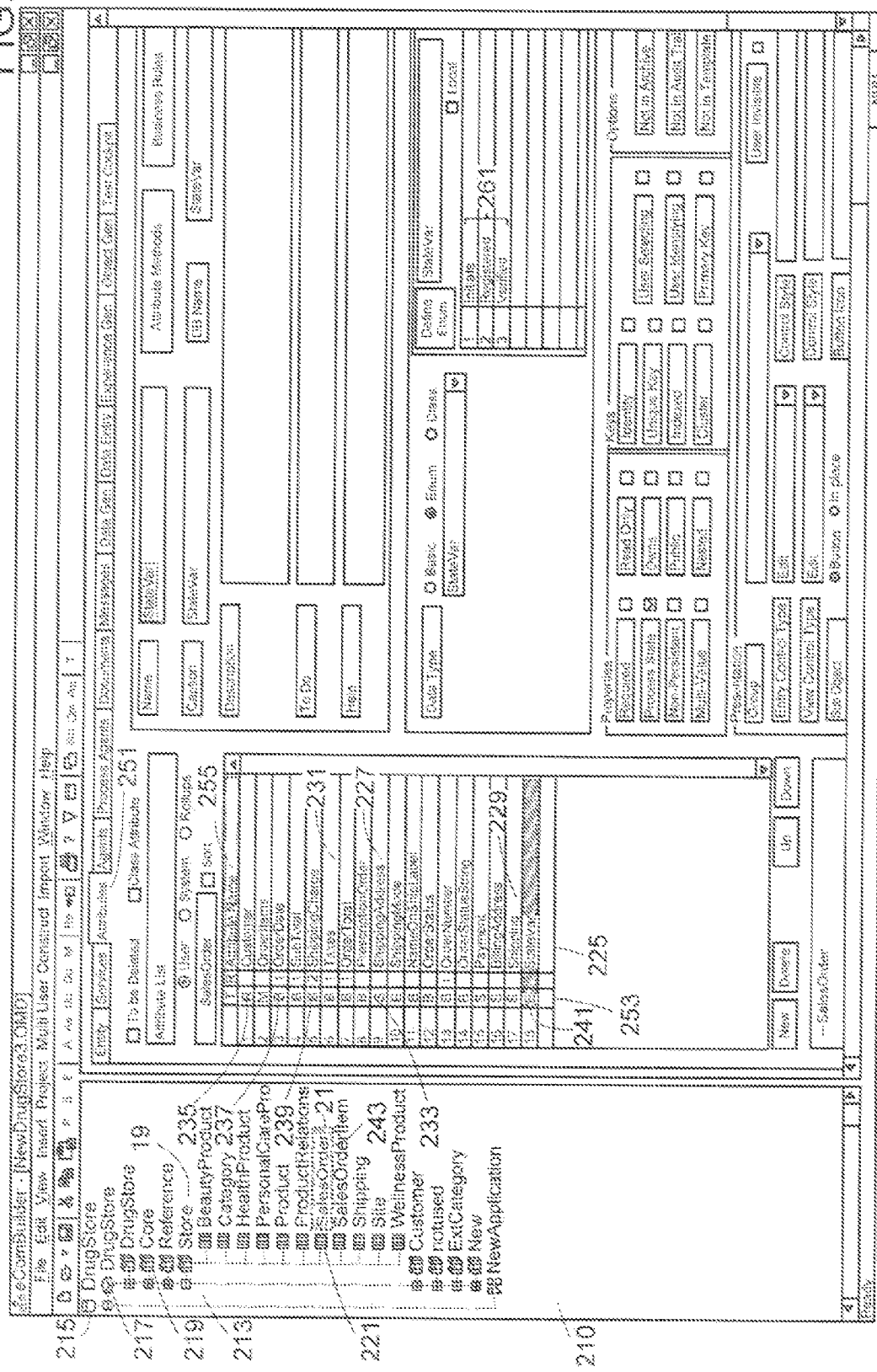
FIG. 2 is a screen rendering electronic form based Class Editor GUI for editing the properties of Business Classes.

The visually illustrated attributes of ownership and inheritance impose constraints on the more detailed descriptions of individual Business Classes. The present invention provides a method for translating the visual, GUI created Business Class model, into a repository based aggregation of data elements. Specifically, once defined using the GUI interface, the characteristics of each Business class so defined are recorded in electronic format on a medium which is either centrally located or which may communicate with other like repositories. With reference to FIG. 2, the present invention comprises an electronic form or text based method for editing the properties of Business Classes. A Class Editor 211 has a class layout portion 210 and an attribute portion 225. Class layout portion 210 is comprised of a plurality of icons arranged so as to illustrate logical groupings of Business Classes. In the present example, repository icon 215 indicates a repository containing all data defining the operation of a drugstore. The drugstore repository of the present example is comprised of a single drugstore Package as indicated by package icon 217. A Package is comprised of one or more subjects. The drugstore Package is comprised of a plurality of Subjects each designated by a subject icon 219. Subject store 19 is illustrated as comprising a plurality of Business Classes. In the present example, SalesOrder 21 is designated as a Business Class by the corresponding business class icon 221. The text "SalesOrder" designating SalesOrder 21 is additionally illustrated as surrounded by a gray rectangle 243. The presence of the gray rectangle 243 is indicative of a user having selected the text through the GUI interface. Such selection may be accomplished through any appropriate means including, but not limited to, single-clicking upon the text.

Class editor 211 is comprised of a series of "tabs" such as attribute tab 251. The tabs serve to logically arrange the plurality of aspects which comprise classes including, but not limited to, subjects, packages, and repositories. With respect to SalesOrder 21, selection by the user of attribute tab 251 causes attribute table 225 to be displayed. Attribute table 225 is comprised of attribute relationship column 253 and attribute name column 255. All of the relationships described above between Business Classes that were defined visually through the GUI by a user are automatically stored in a manner which allows for textual display in attribute table 225. In addition to the information which is derived from the graphical representation of Business Classes illustrated in FIG. 1, the user may enter additional information concerning the attributes of individual Business Classes which are not derived from their relationships with other Business Classes.

Each attribute name listed in attribute name column 255 has an associated value displayed in attribute relationship column 253. Possible values for attribute relationship column 253 include "R", "M", "S", "B", and "E." While the present implementation uses the aforementioned values, any values may be used that uniquely identify a plurality of attribute relationships. While, in the present example, attribute table 225 includes an entry for each and every Business Class for which a relationship was defined in FIG. 1, the entry in attribute name column 255 which represents a Business Class possessing a relationship with SalesOrder 21 does not necessarily bear the same name as the Business Class defined in FIG. 1. This follows from the observation that while a single relationship may be established between two entities, the manner in which each entity views the relationship may vary.

For example, consider two person who are married. There exists a relationship between the two persons. This relationship is optimally a one-to-one relation as each person can be married to no more than one person. The relationship of marriage is the same relationship whether viewed from the perspective of the man or the woman. However, the woman views the person with whom she has a relationship as her husband while the man views the person with whom he has a relationship as his wife. Therefore, if the man is represented as a Business Class, it is preferable to have an entry in attribute table 225 identified as wife. Conversely, the same relationship viewed through the Business Class representing the woman might have an entry for a husband. The present invention provides a method whereby every Business Class can tie a preferred name to a relationship with another Business Class.

Figure 3:
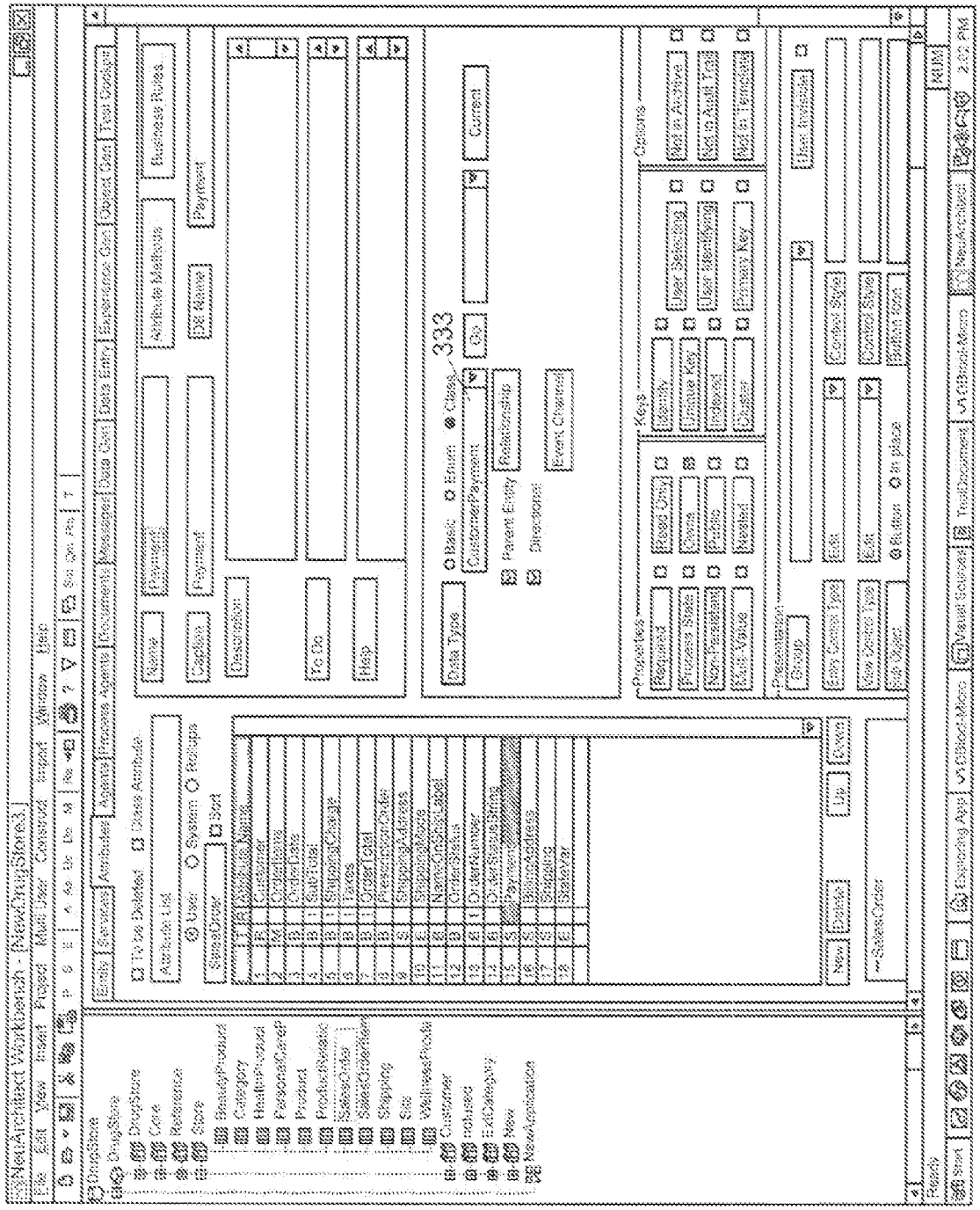
FIG. 3 is a screen rendering of a text-based methodology for displaying attribute data using the Class Editor GUI.

As illustrated graphically in FIG. 1, each SalesOrder 21 is associated with a CustomerPayment 33. However, attribute name column 255 does not contain an entry for "CustomerPayment." As illustrated in FIG. 3, when the row in attribute name column 225 containing the text "Payment" is selected, the variable name "CustomerPayment" appears in data type entry field 333. Therefore, referring once again to FIG. 2, the "Payment" entry in attribute name column 255 refers to the relationship between SalesOrder 21 and CustomerPayment 33. It will be noted that each entry in attribute name column 255 has an associated entry in attribute relationship column 253. Every relationship between two Business Classes is bi-directional. An entry in the attribute relationship column 253 further defines the nature of the relationship.

An "M" entry indicates a one-to-many relationship. In attribute table 225, the "OrderItems" entry in attribute name column 255 indicates the relationship between SalesOrder 21 and SalesOrderItem 25. Associated with OrderItems is an attribute relationship of "M." This indicates that a single sales order can possess multiple order items.

An "S" attribute indicates a relationship with a Business Class that itself possesses an "R" attribute. Returning to the example of a male class and a female class, the function of the "S" and "R" attributes is apparent. Because each male has one and only one wife, the male class will contain a wife attribute with an "S" relationship attribute. "S" refers to single, as in each male has a single wife. The female class will contain a husband attribute which stands in reference to the wife attribute of the male class. Therefore, the husband attribute of the female class will have an "R" attribute. In addition, there may exist instances where corresponding attributes in separate classes will exhibit an attribute relationship "M" and an attribute relationship "R." In the present example, a male class may have an attribute of daughter with an "M" attribute relationship while the female class will have an attribute of father with an "R" attribute relationship. This results from the fact that male may have several daughters while each female has one and only one father.

As noted, any number of attribute relationships may be recorded and the present invention is not limited to those described. Rather, any relationship between Business Classes which may be conceived and which serves to define the operation of a Business Class may likewise be captured through the GUI, stored on the repository, and used to generate code and various other data entities related to the Business Class so defined.

Referring to FIG. 2, attribute name "Customer" entered in attribute name column 255 has an associated attribute "R" 235. Attribute name "ShippingAddress" entered in attribute name column 255 has an associated attribute "S" 235. Therefore, SalesOrder 21 relates back to Customer 27 while CustomerAddress relates back to SalesOrder 21.

The attribute "B" refers to a basic data type. A basic data type is usually implemented in computer code as a numeric value including, but not limited to, integers and floating point numbers. In addition, a basic type may be comprised of a byte sequence representing text. The attribute "E" refers to an enumerated data type. Enumerated data types contain integer values with each unique integer value reprinting a state as illustrated more fully below. Note that in FIG. 2, attribute name "StateVar" entered in attribute column 255 has an associated attribute "E" 235. The gray area surrounding the text "StateVar" indicates that user has selected the entry by clicking on the text or through other appropriate means. As a result of the selection, data type information is displayed in data type table 261. There is illustrated enumerated values of "1", "2", and "3" associated with states "Initiate", "Registered", and "Payment Processed" respectively.

Figure 4:
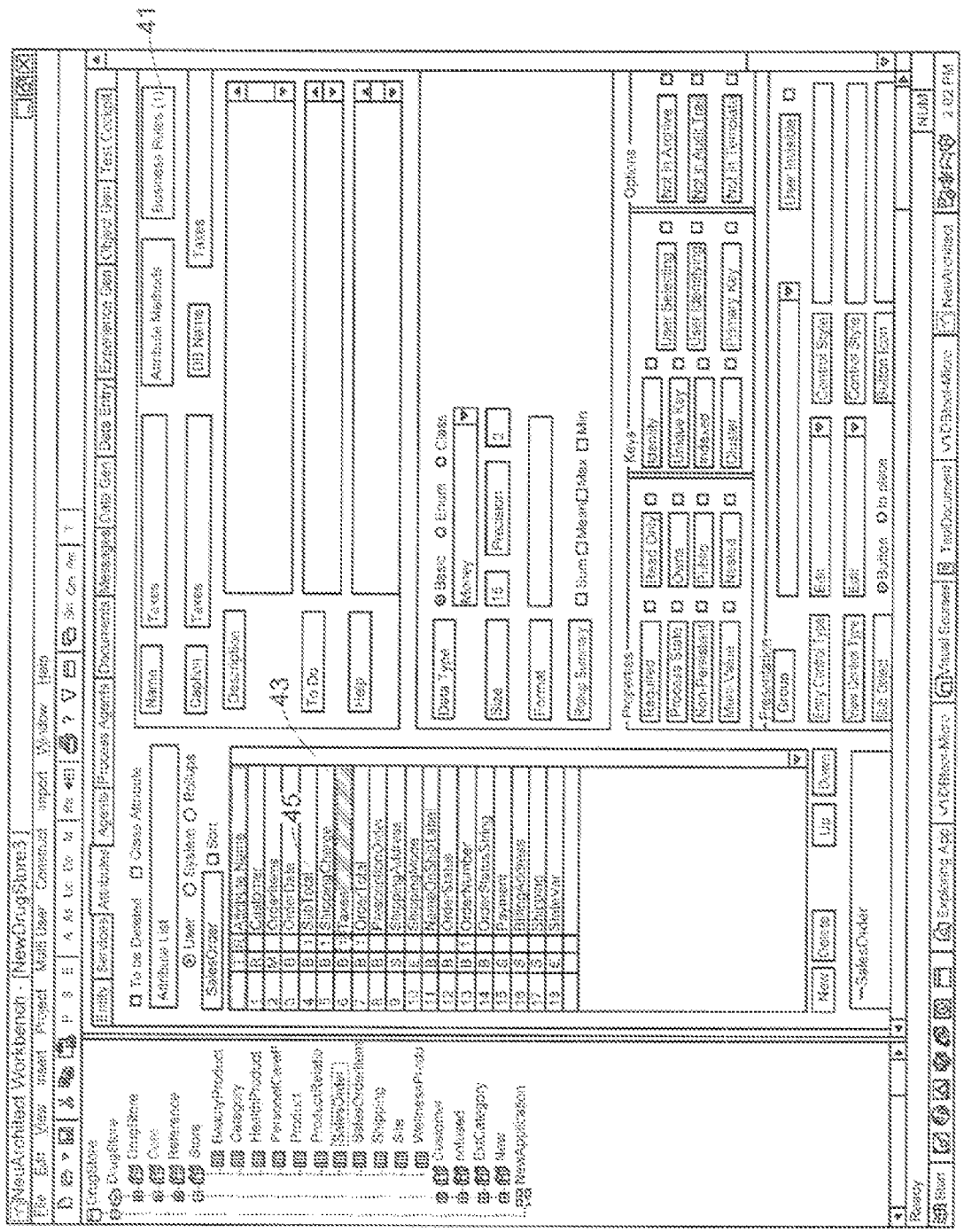
FIG. 4 is a screen rendering of the Class Editor GUI of FIG. 2 illustrating class attributes and their attendant business rules.
Figure 5:
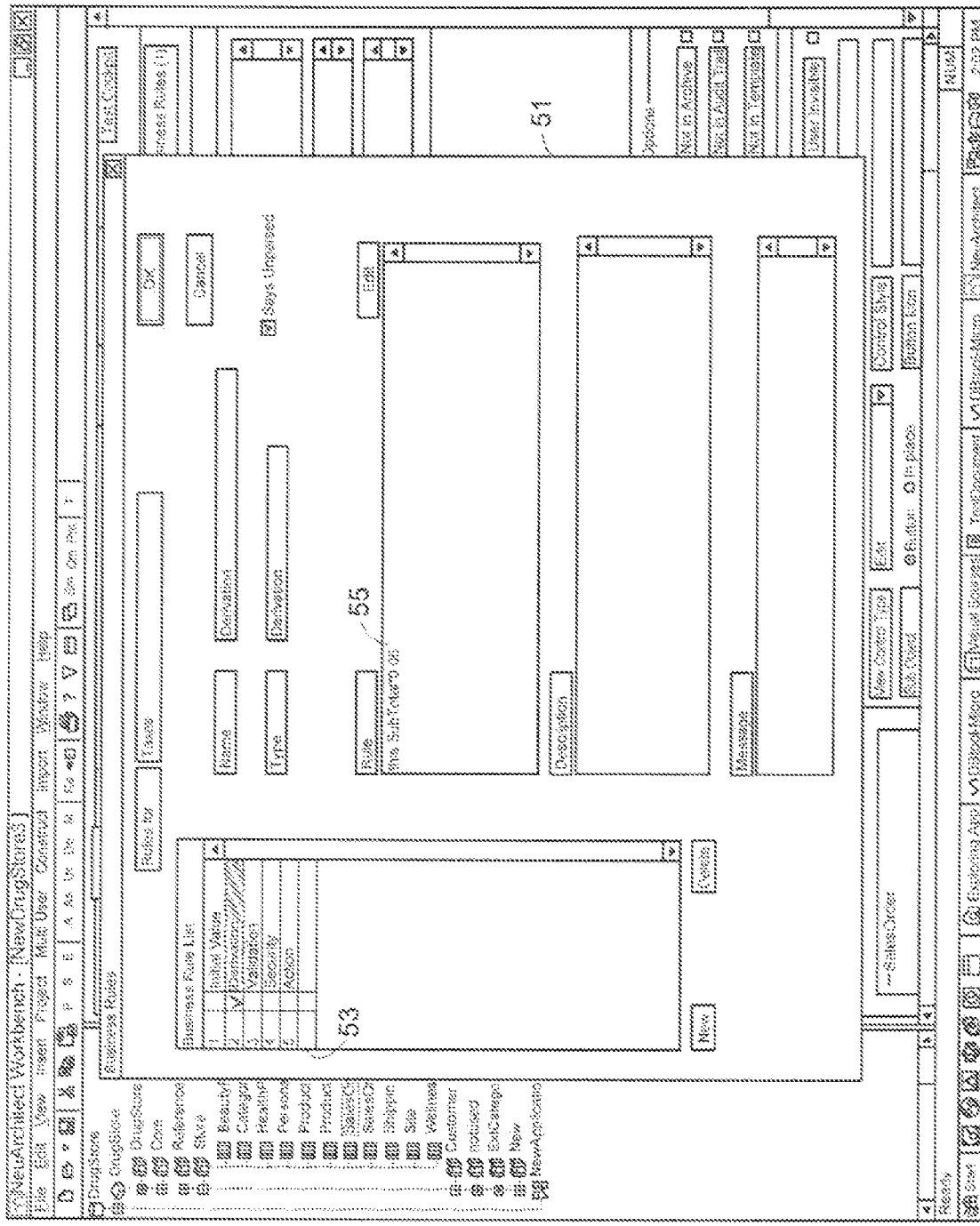
FIG. 5 is a screen rendering of the business rule portion of the Class Editory GUI of FIG. 2.

A basic data type, such as "Taxes", may have one or more associated Business Rules. Business Rules are tied to attributes. With reference to FIG. 4, attribute "Taxes " has been selected and appears highlighted. As a result, business Rule button 41 is re-plotted with the annotation "(1)." If more than one Business Rule were associated with "Taxes," the annotation appearing in Business Rule button 41 would reflect the number of Business Rules so associated. Clicking on Business Rule button 41 invokes Business Rule window 51 as illustrated in FIG. 5. Business Rule window 51 is comprised of Business Rule table 53 and business rule 55. Business Rule table 53 lists five types of Business Rules including, but not limited to, "Initial Value", Derivation", and "Validation". An example of an initial value Business Rule would be "this.Quantity=0". An example of a validation Business rule might consist of the following code:

```
If (this.Quantity > 0)
    return TRUE;
else
    return FALSE;
```

An example of a derivation Business Rule might consist of the following code:

this.Quantity1=this.Quantity3* this.Quantity3;

A Business Rule is comprised of logic which contains sufficient structure to enable the generation of computer executable code to perform the defined functionality. An example of such exemplary code is "this.SubTotal*0.06". Business Rules may be tied to an entire Business Class, and hence to all Business Objects derived therefrom, or to an individual instance of a Business Class.

In the present example, business rule 55 is comprised of the following logic: "this.SubTotal*0.06". Because business rule 55 is of type "Derivation, " the logic serves to specify how the value of taxes attribute is derived or computed. Using logic descriptors similar to the syntax of C++, business rule 55 states that the value of taxes attribute 43 is equal the value of attribute subtotal 45 multiplied by 0.06. Attribute subtotal 45 may itself derive its value from a Business Rule which states a dependence on one or more other attributes. As illustrated, all SalesOrder Business objects derived from the SalesOrder Business Class will inherit the described taxes business rule 55. However, it is preferable to have a method by which the individual attributes of Business Objects are derived and processed different from one another based upon the unique characteristics of the Business Object. The present invention allows for the incorporation into a Business Rule of logic which is specific to a particular instantiation of a Business Object.

For example, to calculate a separate discount rate for business purchasing goods from a particular web site one could code a derivation Business Rule which would return a different discount rate based upon the identify of the buyer. Such a Business Rule might appear as follows:

If this.customer="Joe" then this.discount=0.06;

else if this.customer="Fred" then this discount=0.09;

else if this.customer="John" then this.discount="0.03";

In this manner, different customers would receive different discount rates. However, such a methodology relies on hard-coding the identify of customers and their attendant discount rates. Using such a methodology presents challenges when a new customer is added. Specifically, such a methodology requires that the Business Rule within which each separate discount rate is specified contains a hard-coded algorithm for deriving the appropriate discount rate for a given customer. If in the future another customer were added, it would be necessary to re-code the Business Code to include new discount rate derivation code, regenerate the rune time application components of the architecture, and redistribute the new components. Such a process requires considerable new code to be added to an existing architecture requiring potentially laborious testing.

The present invention avoids these drawbacks by allowing a reference in a Business Rule to a row and column in a relational database associated with a defined attribute. While the present invention is illustrated herein with reference to a relational database, the present invention is drawn broadly to the use of any form of memory storage capable of receiving a request for data based upon identifying criteria and returning the data so requested. In this manner, one is able to locate a portion of the logical code comprising a Business Rule outside of the Business Rule definition contained in a Business Class. When such a Business Rule is invoked at run-time, the referenced portion of the Business Rule located externally in the relational database is retrieved and executed. Such execution may consist of interpreting the code or compiling and subsequently executing the code. The result of such a method is the ability to change the functionality of a statically defined Business Rule based upon the identify of a customer or other Business Class attribute.

As has been illustrated, the attributes corresponding to a Business Class fall generally into two groups, those which can be derived form the graphic representation of Business Class relationships as illustrated in FIG. 1, and those which must be manually defined. Regardless of which of the two types into which an individual attribute falls, Business Rules may be defined and tied to the attribute. Regardless of whether a Business Rule accesses the values of other attributes, each Business Rule is tied to one and only one attribute. In contrast to the attribute dependent nature of Business Rules, there exists Business Class level Business Processes which are tied to individual Business Classes. Like Business Classes, however, a portion of the logic required to implement Business Processes may be derived from a graphical representation of the relationship between Business Processes.

Figure 6:
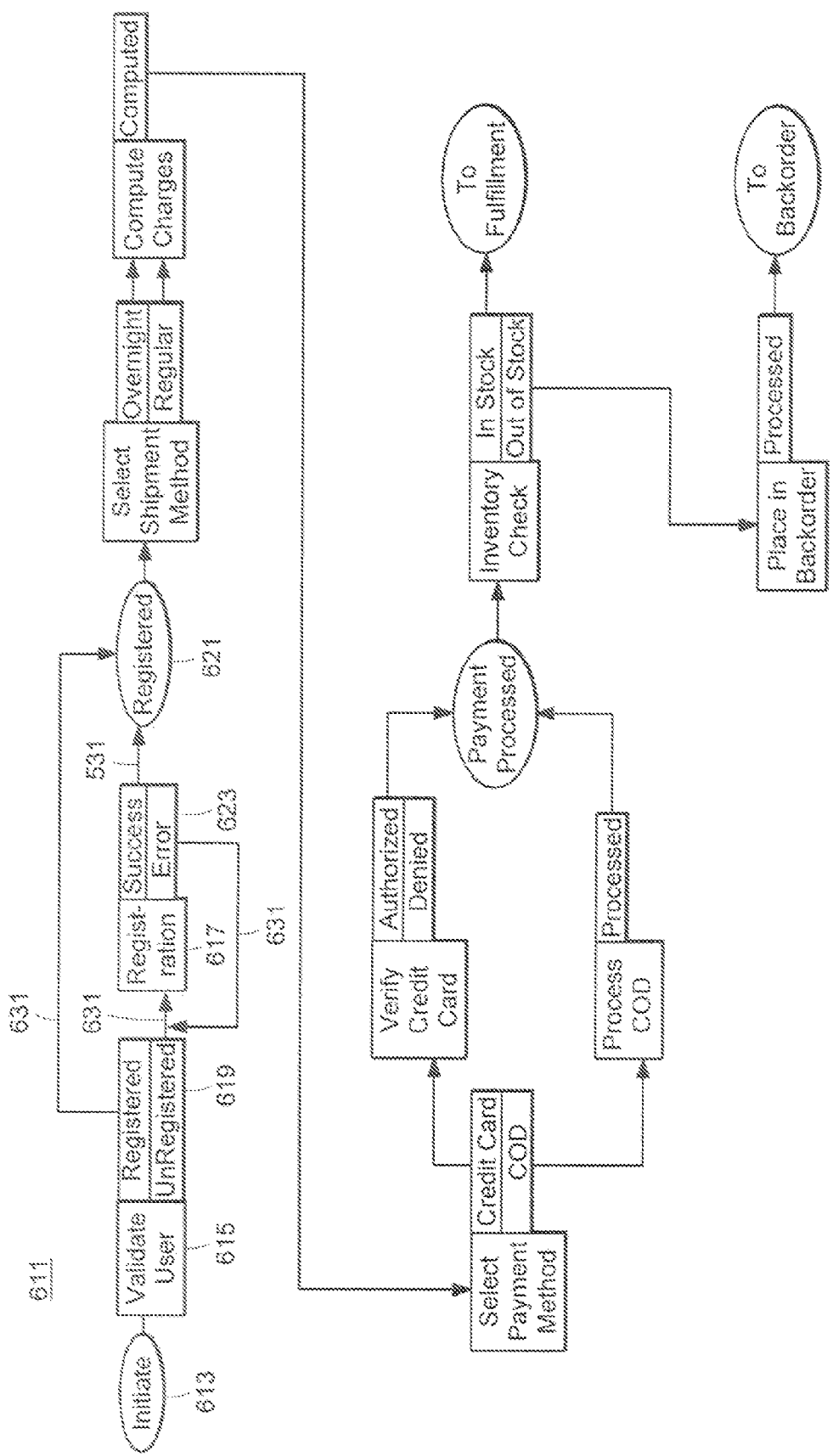
FIG. 6 is a schematic illustration of a Business Process Editor GUI.

Business Processes are comprises of states and subprocesses, may be comprised of one or more Business Methods, or may consist of one or more manual processes. A state is the present condition of a Business Class. As detailed with reference to FIG. 2, attribute "StateVar" is an enumerated data type where possible states include "Initiate, " "Registered," and "Payment Processed." Subprocesses consist of the logic or operations required to move a Business Class from state to state. FIG. 6 illustrates the GUI interface for the present invention's Business Process Editor 611. Business Process Editor 611 allows the user to define states 613, and 621, Subprocesses 615 and 617, and the states 619, 623 which result from the operation of Subprocesses. Focusing on a portion of the state diagram illustrated in Business Process Editor 611, the user has created elliptical state icons 613 and 621, rectangular Subprocess icons 615 and 617, and rectangular state icons 619 and 623 attached thereto. Such shapes are exemplary and not required. The portion of the Business Process thusly comprised illustrates the initial state of the Business Class SalesOrder shown as initiate state 613, and the Business Methods validate user 615 and registration 617 required to move Business Class SalesOrder to registered state 621.

As is illustrated, the user has created an icon and assigned a textual attribute of "initiate" to form initiate state 613. Next, the user defined two Business Methods in series with initiate state 613 and connected by arrow lines 631. The Business Methods were next assigned the textual attributes of "Validate User" and "Registration" to form validate method 615 and registration method 617. Associated with each method 615, 617 are the states resulting from the operation of the methods. In the present example, the user has defined two possible outcomes for validate method 615; registered or unregistered. Similarly, the user has defined two possible outcomes for registration method 517; success or error. Connected to registration method 617 via arrow line 631 is registered state 621. Each arrow line 631 indicates the direction of logical flow of the Business Process. In the present example a sales order with a state of "initiate" proceeds to validate the user. The diagram of FIG. 5 illustrates that the process of user validation will be accomplished throughout the implementation of a Business Method identified as validate method 615. Upon completion of performing validate method 615, the state of the user will be either "registered" or "unregisteted". If the result is "registered," the logical flow continues, via arrow line 631, directly to registered state 621. If the result is "unregistered," the logical flow continues to registration method 617. Upon completion of performing registration method 617, the state of the registration will be either "success" or "error". If the result is "success," the logical flow continues, via arrow line 631, directly to registered state 621. If the result is "error," the logical flow continues to perform once again registration method 617.

In a manner similar to that illustrated with reference to FIG. 1 and Object Modeler 5, Business Process Editor 611 allows a user, through the utilization of a GUI, to define the logical relationship between entities. While Object Modeler 5 allows the user to define the relationship between Business Classes, Business Process Editor 611 allows the user to define the relationship between Business Class states and Business Methods. In addition, Business Process Editor 611 also allows for the conversion of user defined graphical relationships into detailed, logical abstractions which facilitate the creation of computer code necessary to perform the Business Process so defined.

Figure 7:
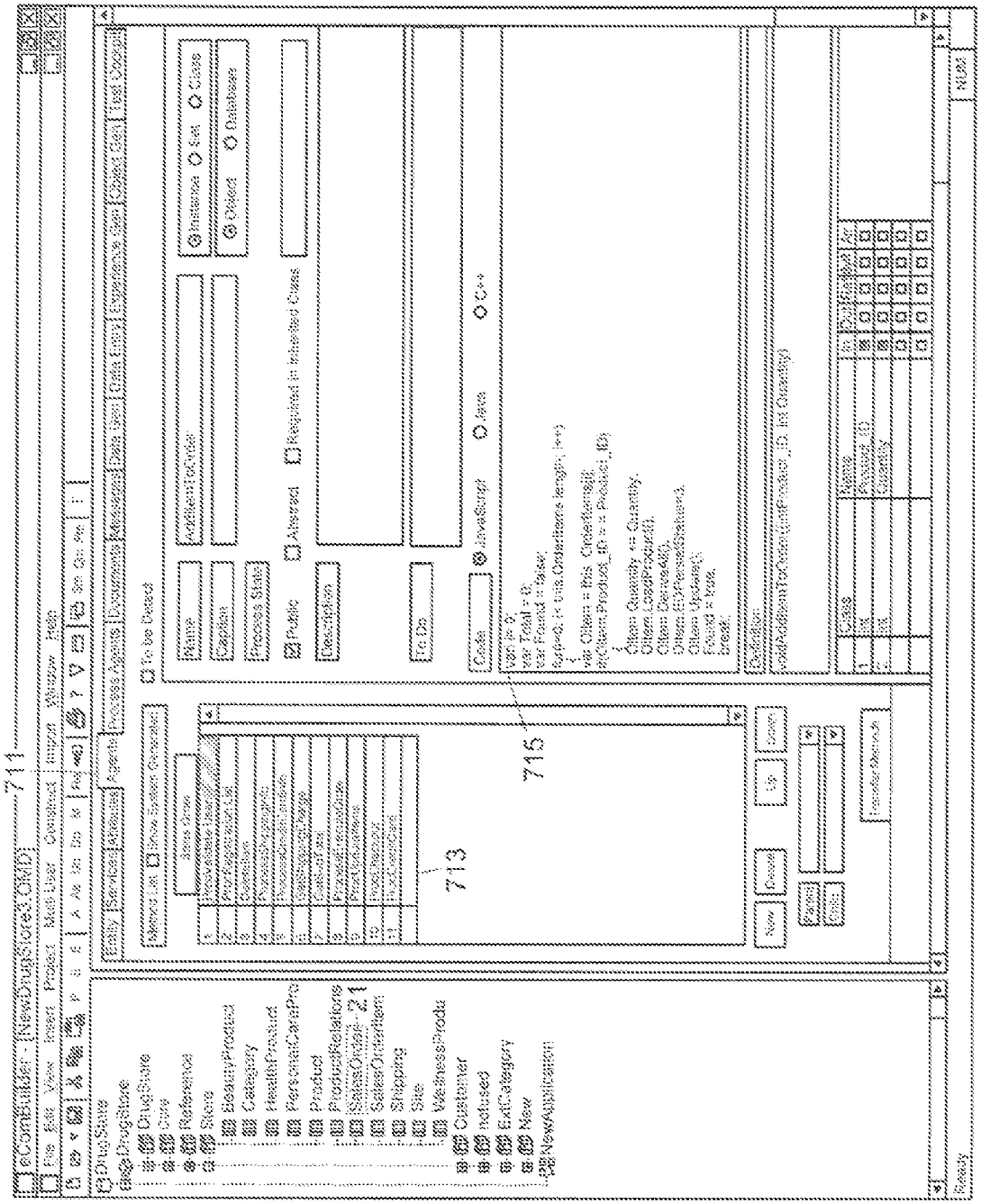
FIG. 7 is a screen rendering of a GUI utilized to display Business Methods.

As described above with reference to FIG. 2, there is illustrated attribute name "StateVar" entered in attribute name column 255 with an associated attribute "E" 235. There is additionally illustrated enumerated values of "1", "3", and "3" associated with states "Initiate", "Registered", and "Payment Processed" respectively. These states were derived from the graphical description of the Business Process illustrated in FIG. 6. With reference to FIG. 7, there is illustrated the GUI utilized by a user to define Business Methods. Note, as with FIG. 2, SalesOrder 21 is selected. Once selected, the user may click, or otherwise select, agents tab 711 to display Business Method information. Selecting agents tab 711 causes Business Method table 713 and Business Method code window 715 to be displayed. Business Method table 713 lists all Business Methods associated with SalesOrder 21. Some of these Business Methods are derived from the relationships specified graphically in Business Process Editor 511 and some are user defined Business Methods not derivable from information entered into Business Process Editor 511. Still other Business Methods are derived from the Business Class relationships specified in Object Modeler 5 as illustrated in FIG. 1.

With reference to FIG. 7, there is seen Business Method table 713. Business Method table 713 is comprised of multiple Business Methods. Among these Business Methods are "ProcValidateUser" and "ProcRegistration." ProcValidateUser and ProcRegistration refer to validate method 615 and registration method 617. As a result of the user defining validate method 615 and registration method 617 using Business Process Editor 611, the names of the methods 615, 617 appear in Business Method table 713. The gray rectangle surrounding the text "ProcValidateUser" indicates that the user has selected the first row of the Business Method table 713. As a result of the selection, the code which forms the substance of validate method 615 appears in Business Method code window 715. If code associated with validate method 615 has been previously entered into Business Method code window 715, the code will appear in Business Method code window 715. In addition, code may be added or modified by altering the contents of Business Method code window 715.

In addition to the Business Methods whose names are automatically generated based upon the inputs to the Business Process Editor 611, the present invention can generate both entries and the attendant code for other standard Business Methods. As mentioned, each attribute comprising a Business Class may have a validation Business Rule associated with it. Such a Business Rule provides logic for determining the validity of the attribute to which it is tied. However, Business Rules can only be tied to single attributes. Business Methods, on the other hand, are tied to Business Classes and, as such, may operate on one or more attributes. Because of this property, it is possible to generate a plurality of Business Methods. For example, there can be generated, and the present invention does generate, a Business Method which automatically invokes the validation Business Rules tied to each attribute in order to establish a Business Class validation.

In addition to creating standard attribute validation, the present invention is capable of generating Business Methods to perform Business Class management functions. Such functions manage the allocation of memory comprising the persistent transient electronic data storage space which define the run-time characteristics of a Business Class. As illustrated in FIG. 1 and discussed above, SalesOrder 21 has a one-to-many relationship with SalesOrderItem 25. That is to say that one SalesOrder 21 may have a plurality of SalesOrderItems 25. While not illustrated herein, it is likewise possible that each SalesOrderItem 25 could have a one-to-many relationship with another Business Class. If, while executing the Business Process comprising the SalesOrder Business Class, it becomes necessary to abort the processing of a sales order, it is preferable to be able to delete all the dependent instances of Business classes which have been created and are in existence. It is therefore one aspect of the present invention to automatically generate for each Business Class the Business Methods required to handle the deletion of dependent Business Classes and their attendant data.

The present invention allows the user to define each Business Class as being of type "restrict" or type "cascade." If a Business Class is of type "cascade," the run-time embodiment of the Business Class, when no longer valid, will propagate the requirement of deleting dependent Business Classes. As each dependent Business Class may itself comprise further dependent Business Classes, the deletion logic will propagate in tree like fashion from the original Business Class to the last Business Class or Classes dependent thereupon. If, conversely, a Business Class is of a type "restrict," the run-time embodiment of the Business Class, when no longer valid, will not proceed to extinguish itself if there are existing Business Classes dependent thereupon.

Figure 8:
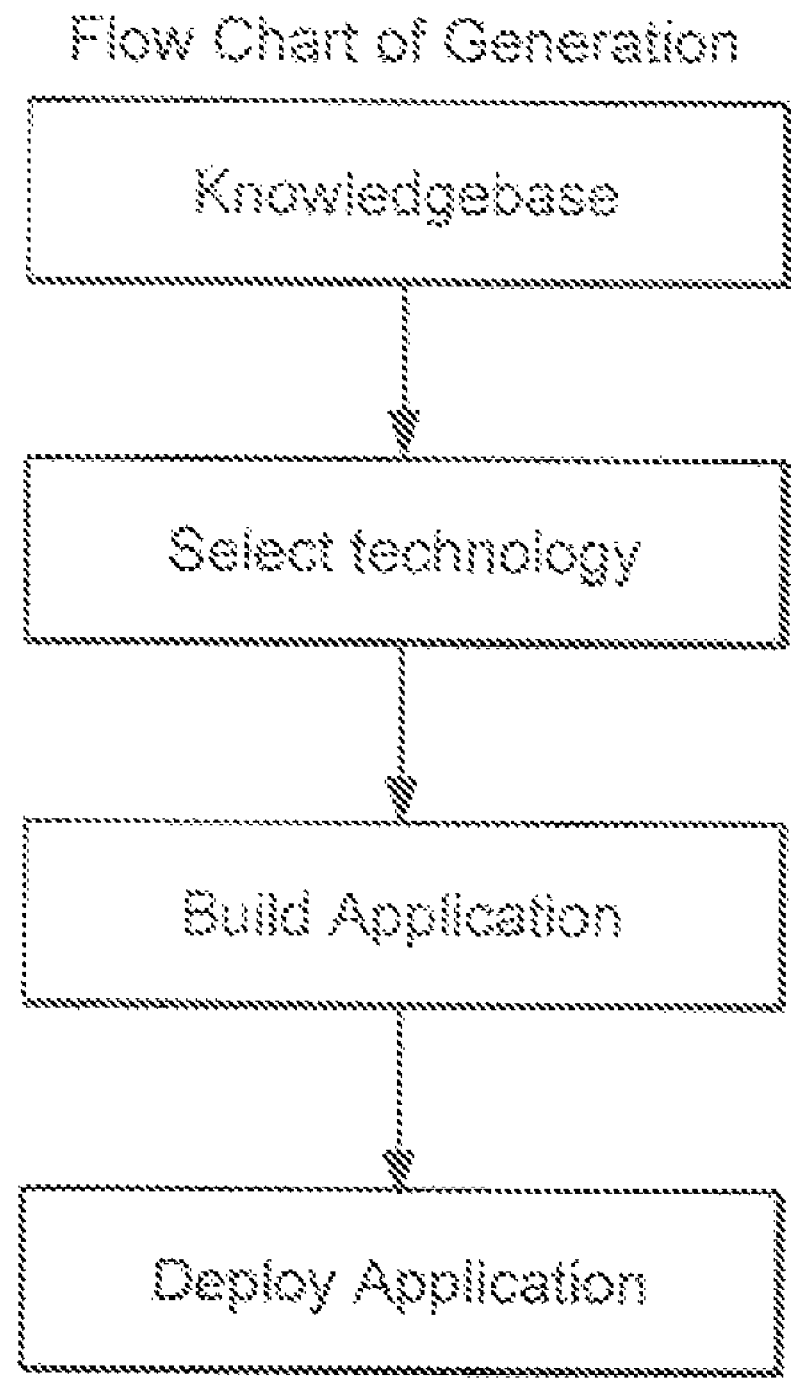
FIG. 8 is a flow chart of the code generation process of the present invention.

The present invention automatically generates Business Methods for each Business Class to allow for the management of Business Class deletions. The generation process flows sequentially from the repository in which are stored the Business Classes comprising an application to the run-time components capable of deployment throughout the architecture on which they are to run. The Business Class definitions residing in the repository form an integrated description of the business model referred to as a knowledge base. Once the knowledge base is created, technology choices, or selections, are inputted to direct the generation of individual run-time components. For example, a user might designate the generation of C++ code and JAVASCRIPT code to be generated for distribution to different platforms. Once the technology is selected, the present invention proceeds to translate the neutral code of the Business Classes into the designated technology specific language thus building the completed run-time application which forms the output of the present invention. In addition, the process of building the application may include the additional step of compiling the generated run-time components to create executable code. After building the application, the generated and executable components are deployed to the platforms upon which they will execute. This process of code generation is graphically depicted in flow chart form with reference to FIG. 8.

The code comprising each such Business Method is generated for inclusion by the user into other Business Methods. The generated code allows for the deletion of both the persistent and the non-persistent, or transient, data which comprises a Business Class. As noted, a Business Class forms the template for a particular run-time Business Object. The Business Object is an instance of the Business Class.

A Business Object, when implemented in computer code forming the run time manifestation of the Business Object, comprises persistent and transient representations. For example, there may exist an instance of the SalesOrder Business Class representing an actual run-time sales order. This sales order Business Object, comprising attributes and the attendant functionality required to implement the defined Business Processes and Business Rules, is located in a defined portion of memory in an electronic storage device. This portion of memory may consist of, but is not limited to, the RAM memory of the user's computer. This memory space is like comprised of continguous memory addresses and may be allocated and de-allocated as required by the operating system on the user's computer. While the values stored in the memory space comprised of the structure of the sales order Business Class may change, the amount of memory initially allocated is unlikely to do so. For example, when a derivation Business Rule associated with an attribute of a Business Object is invoked, the resulting value is stored in the corresponding attribute variable of the Business Object. While the value in memory may be changed by such an operation, the amount of memory space is unchanged. If the entire memory space containing the structure of the individual Business Object were de-allocated, as when the Business Object is deleted, the Business Object would cease to exist.

However, there is additionally data associated with a Business Object that may persist even after the memory space comprising the Business Object is de-allocated. For example, a SalesOrder Business Object may keep track of the sales items of which it is comprised by storing tabular information in a relational database or other suitable data storage medium. When the transient memory space comprising the Business Object is de-allocated, this tabular data will persist. In many instances, it is the tabular data associated with a Business Object that is most important to delete when the instance of the Business Object is no longer required. Therefore, the present invention automatically generates Business Methods to de-allocate the memory storage space comprising the transient Business Class data as well as those necessary to delete the non-persistent data. Examples of the later Business Methods may include, but are not limited to, SQL, statements.

In addition to the aforementioned methodologies for entering Business Rules and Business Methods, the present invention provides a methodology for defining and generating web pages in a fashion which is fully integrated with the definition of other Business Class attributes.

Figure 9:
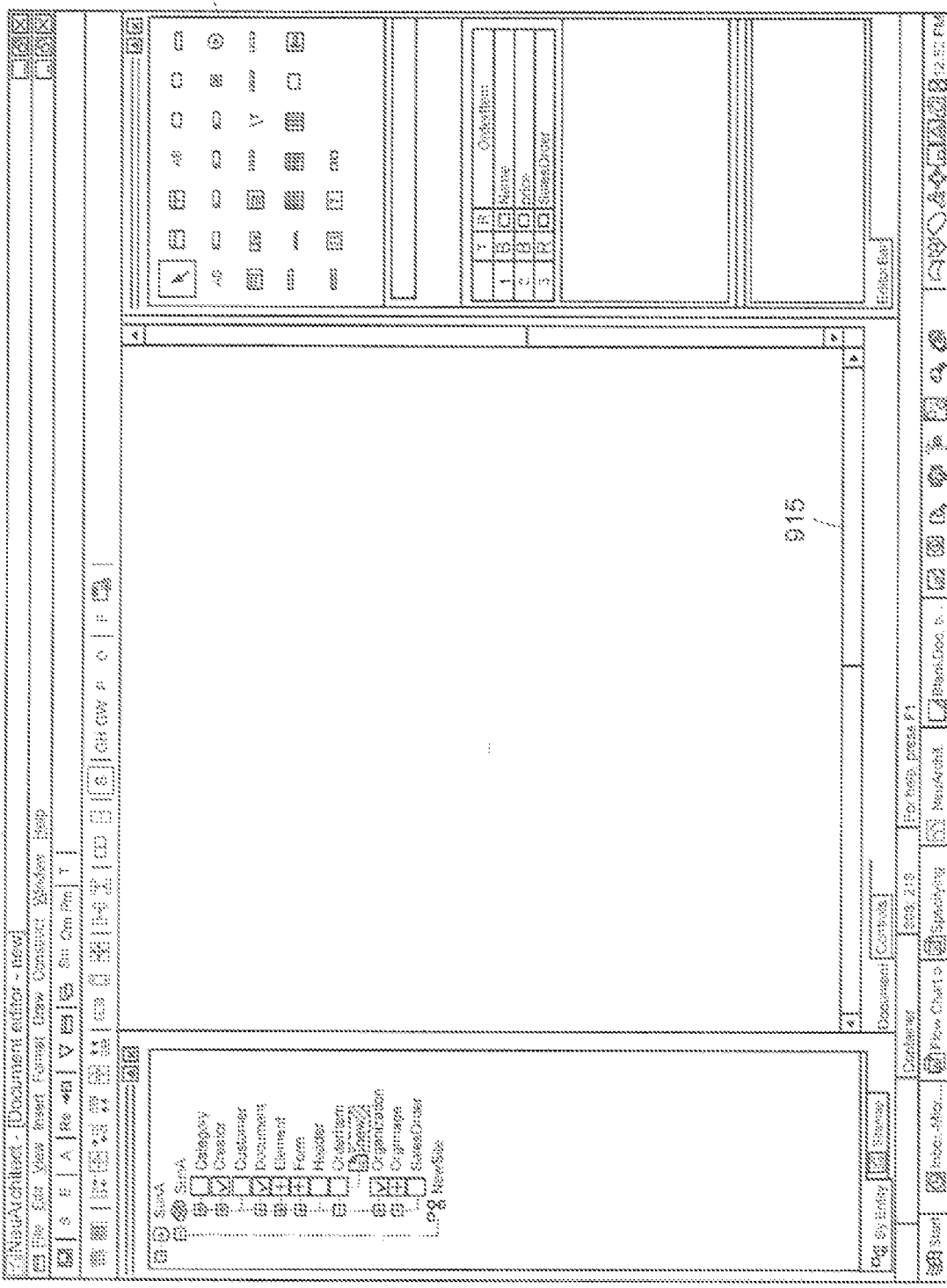
FIG. 9 is a screen rendering of the web page editor of the present invention.

With reference to FIG. 9 there is illustrated the GUI comprising, in part, web page editor 911. Web page editor 911 consists of web page space 915 representing the space upon which graphic and textual elements may be added so as to design a web page. Element selection menu 913 is a collection of icons representing different graphic and textual elements. As shall be more fully illustrated below, elements selected from element selection menu 913 can be selected and placed upon web page space 915 to design and define the layout of a web page.

Figure 10:
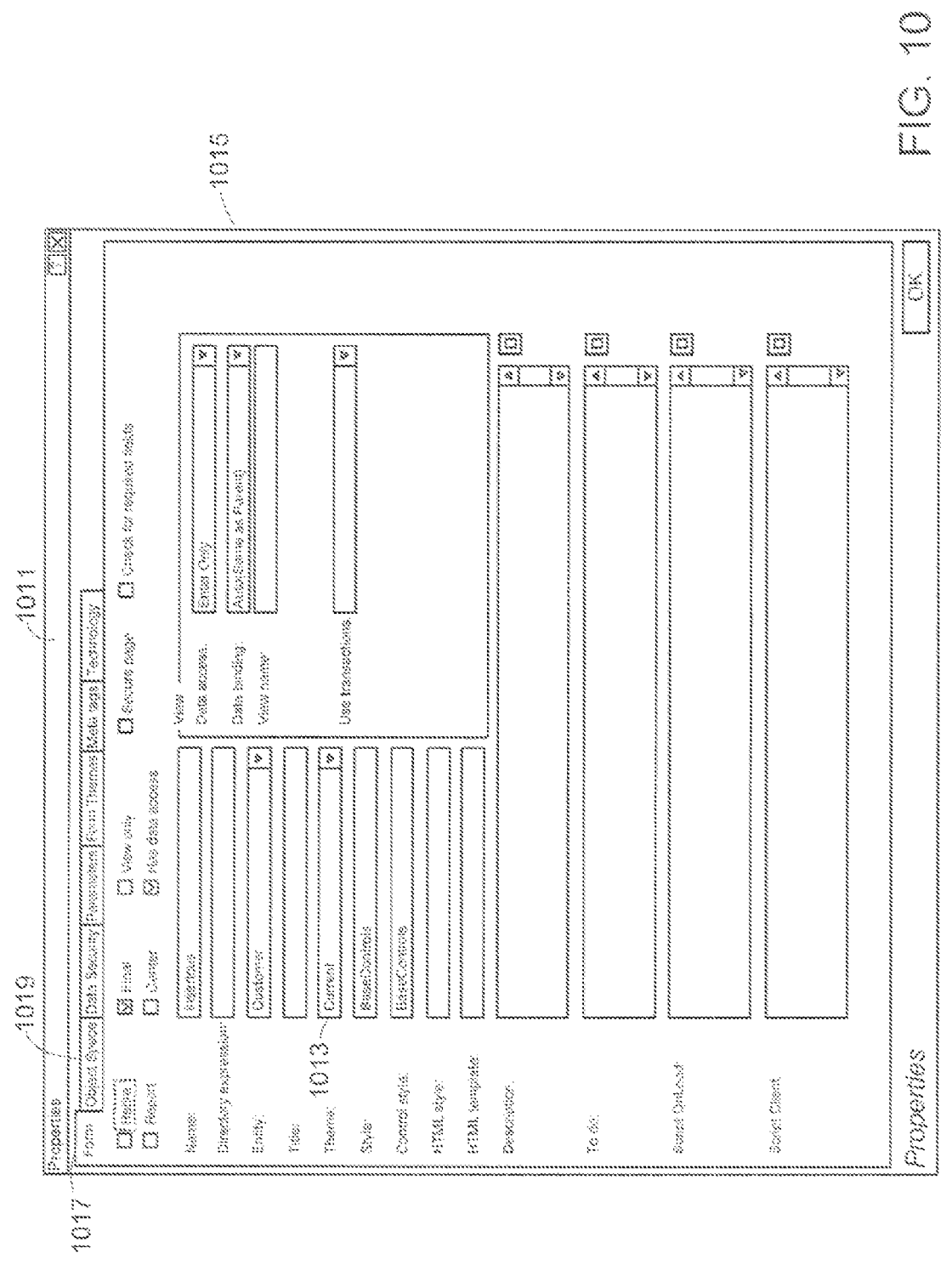

After entering web page editor 911, the present invention allows definition at the micro and macro levels of the attributes which define the web page as a whole and each graphic or textual element individually. Referring to FIG. 10, there is illustrated web page properties editor 1011. Web page properties editor 1011 may be invoked from the web page editor 911 of FIG. 9 in any of a number of appropriate manners including, but not limited to, clocking on a push button or selecting a tab.

Once web page properties editor 1011 is invoked, there is provided a series of tabs such as form tab 1017 and object space tab 1019. In the present example, form tab 1017 has been selected and as a result a series of entry fields are displayed into which customizing data relating to the web page can be entered. Selecting any of the tabs will invoke a separate window interface through which information about the web page or one of its elements may be entered. A variety of input fields such as exemplary input field 1013, is included within web page properties editor 1019. In the present instance, there are displayed a plurality of input fields through which there can be defined a plurality of web page attributes including, but not limited to, a web page's name, title, theme, and style. While illustrated herein with a variety of specific input fields, the present invention is drawn broadly to the inclusion of any and all input fields, of any appropriate construct, which allow the definition of web page attributes. Of note is data binding input field 1015 wherein can be entered the mode by which the web page is to be created and accessed.

Figure 10A:
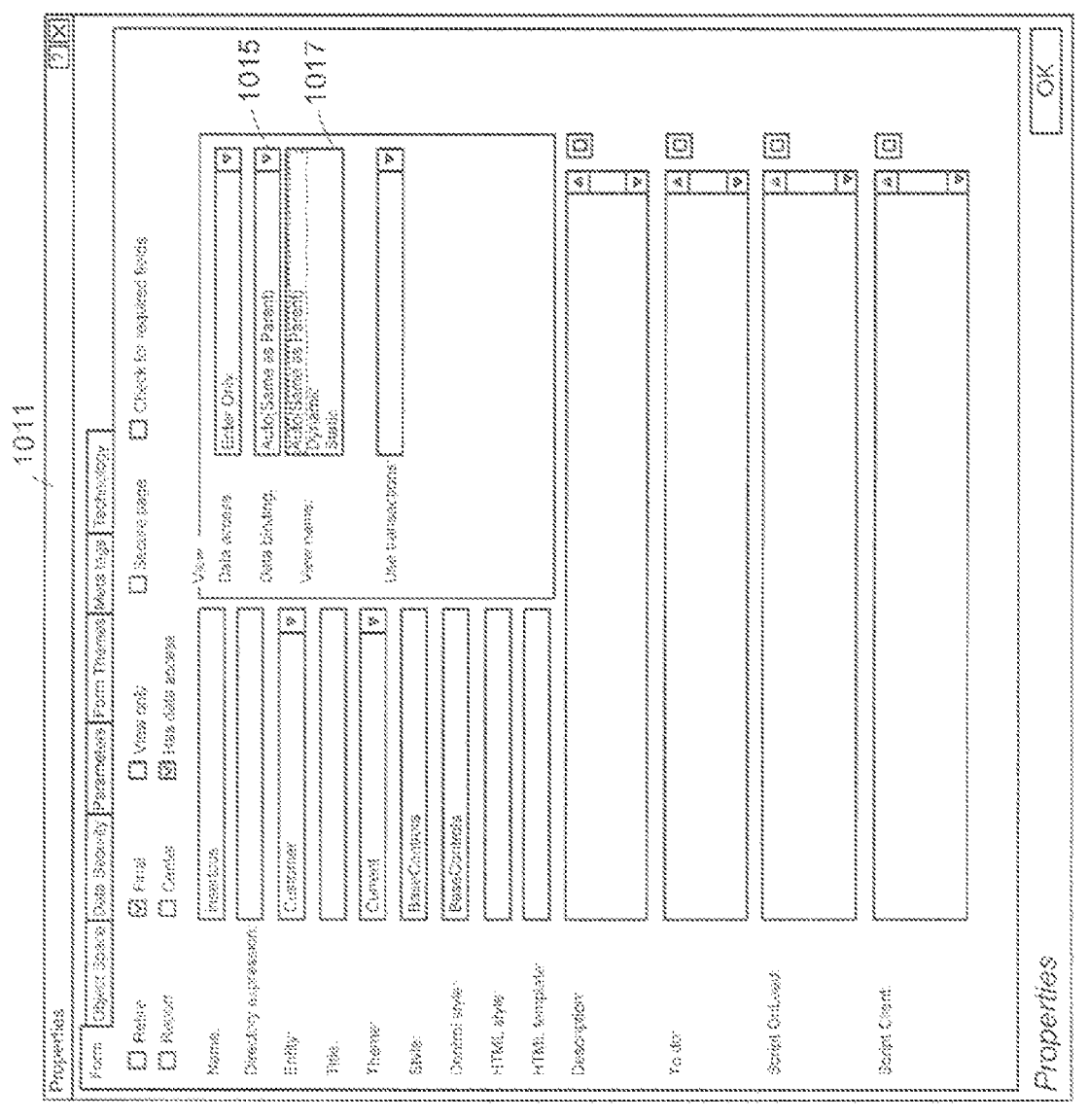

With reference to FIG. 10a, there is illustrated data binding input field 1015 as a drop down list box 1017. Possible selections include "dynamic", "static", and "auto". Selection of static binding will allow the run-time architecture to dynamically update the code comprising the web page at predefined intervals allowing the web page to be stored and accessed as a static web page. Selection of dynamic data binding will provide through the generation of web page code, such as HTML code, of a web page which may be accessed through the run-time architecture. Selection of auto data binding will ensure that the web page is generated according to the same data binding option selected in the Business Class in which the web page resides.

Figure 11:
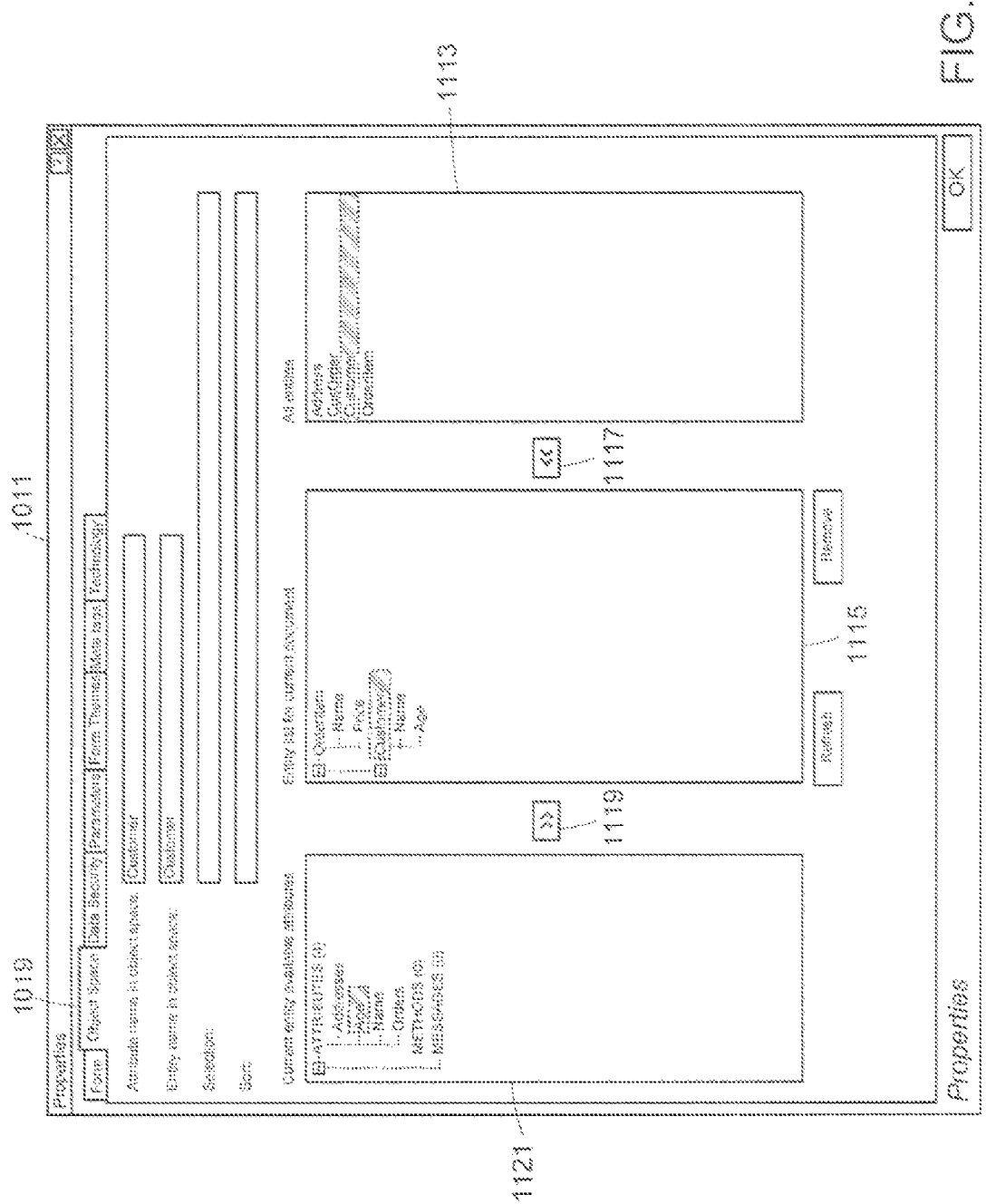
FIG. 11 is a screen rendering of the web page property editor of the present invention showing the object space specified attributes.

The present invention allows for, but does not require, the definition of the object space associated with any web page. As used herein, "object space", refers to the subset of attributes, methods, and rules contained in one or more Business Class definitions which defines the specific functionality required to perform a discreet business function. Use of an object space obviates the difficulties inherent in web based transactions arising from the stateless nature of web based communications. With reference to FIG. 11, there is illustrated web page properties editor 1011 after selection of object space tab 1019. Displayed are entity selection window 1113, available attribute window 1121, current entity window 1115. Data is moved from one window to another through the use of add entity button 1117 and add attribute button 1119. In the present example Business Class customer has been selected and appears highlighted in entity selection window 1113. Once a Business Class has been selected, clicking on add entity button 1117 causes all of the attribute, methods and messages of the selected Business Class to appear in available attribute window 1121. Once included in available attribute window 1121, selecting an attribute, method, or message followed by clicking on add attribute button 1119 will add the selected attribute to current entity window 1115. Current entity window 1115 contains all of the attributes, methods, and messages which comprise the object space associated with the web page. As used herein, a message refers to a sequence of one or more bytes of data which, like a web page definition, has an associated format and object space and may interact with other Business Classes or external code.

Figure 12:
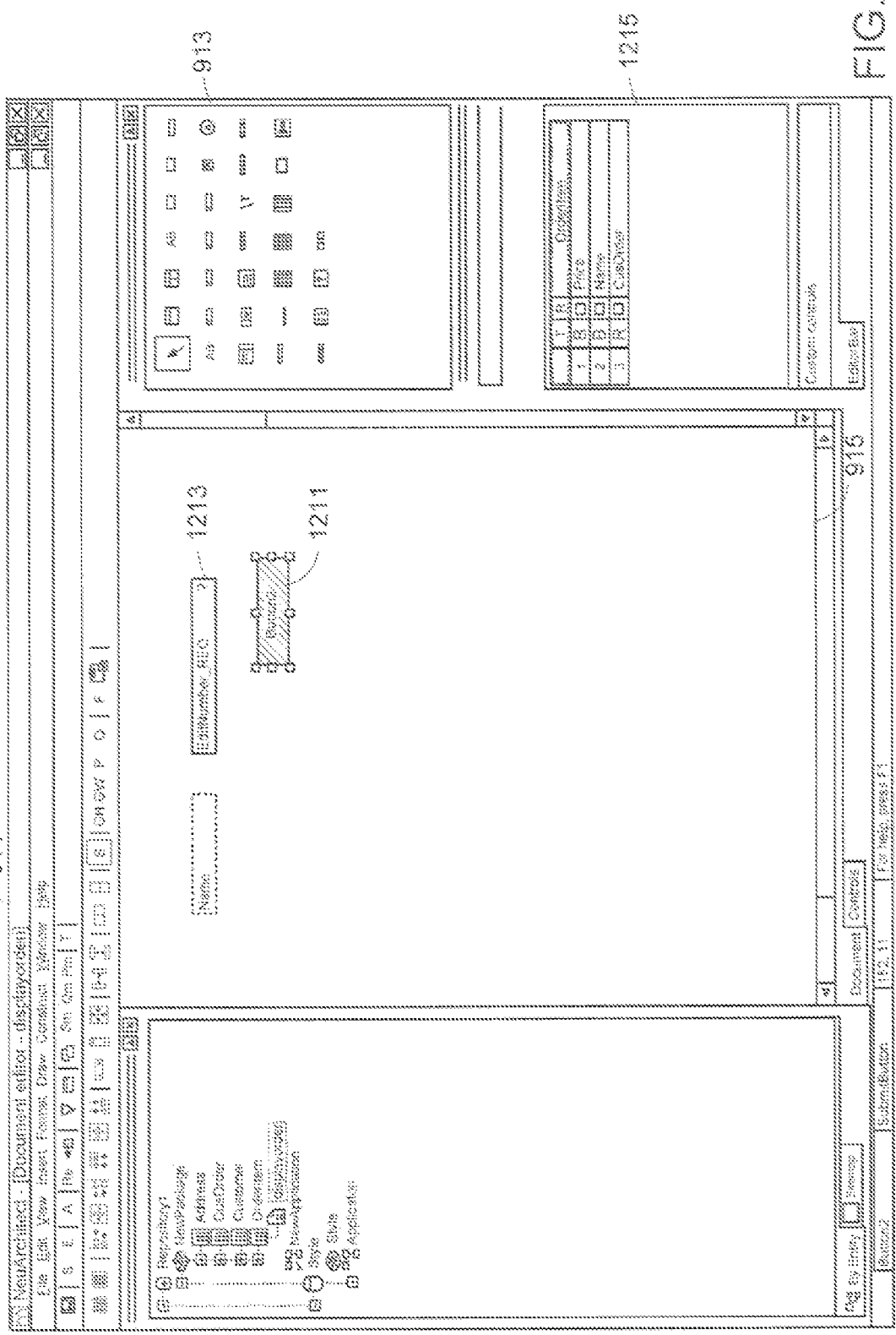
FIG. 12 is a screen rendering of the web page editor of the present invention illustrating the selection and placement of graphical and textual elements.

Whether or not an object space is defined, it is necessary to return to the web page editor 911 of FIG. 9 and to design the web page by placing graphic and textual elements on the web page and associating each element with a Business Class attribute definition. With reference to FIG. 12, there is illustrated web page editor 911 after selection and positioning of exemplary text field 1213 and button 1211 on web page space 915. One method of accomplishing such selection and positioning involves clicking on the icon in element selection menu 913 that corresponds to the element to be placed upon web page space 915 and then clicking on the desired location in web page space 915 where the chosen element is to reside. Once placed in this manner, the element, such as text field 1213 and button 1211, may be selected and moved around web page space 915 as desired in accordance with any of a number of methodologies, including but not limited to, dragging and dropping the element at a new location.

Once graphic and textual elements have been added, their properties must be defined. Note that in the present example attribute window 1215 contains data previously selected when defining the web page's object space. Through any appropriate manner of clicking on a single element in attribute list window 1215 and an element such as text field 1213, the attribute definition of a Business Class attribute may be linked to graphic or textual element on web page space 915. In this manner, information contained in a Business Class definition is automatically linked to the web page element. As mentioned, while an object space may be defined for web page before adding elements to the web page space 915, it need not be predefined. In the present example, the specialized attributes which define the operation of a web page element may be entered without reference to an existing Business Class. In the present invention, one may invoke a control properties windows to enter data particular to a specific element or control.

Figure 13:
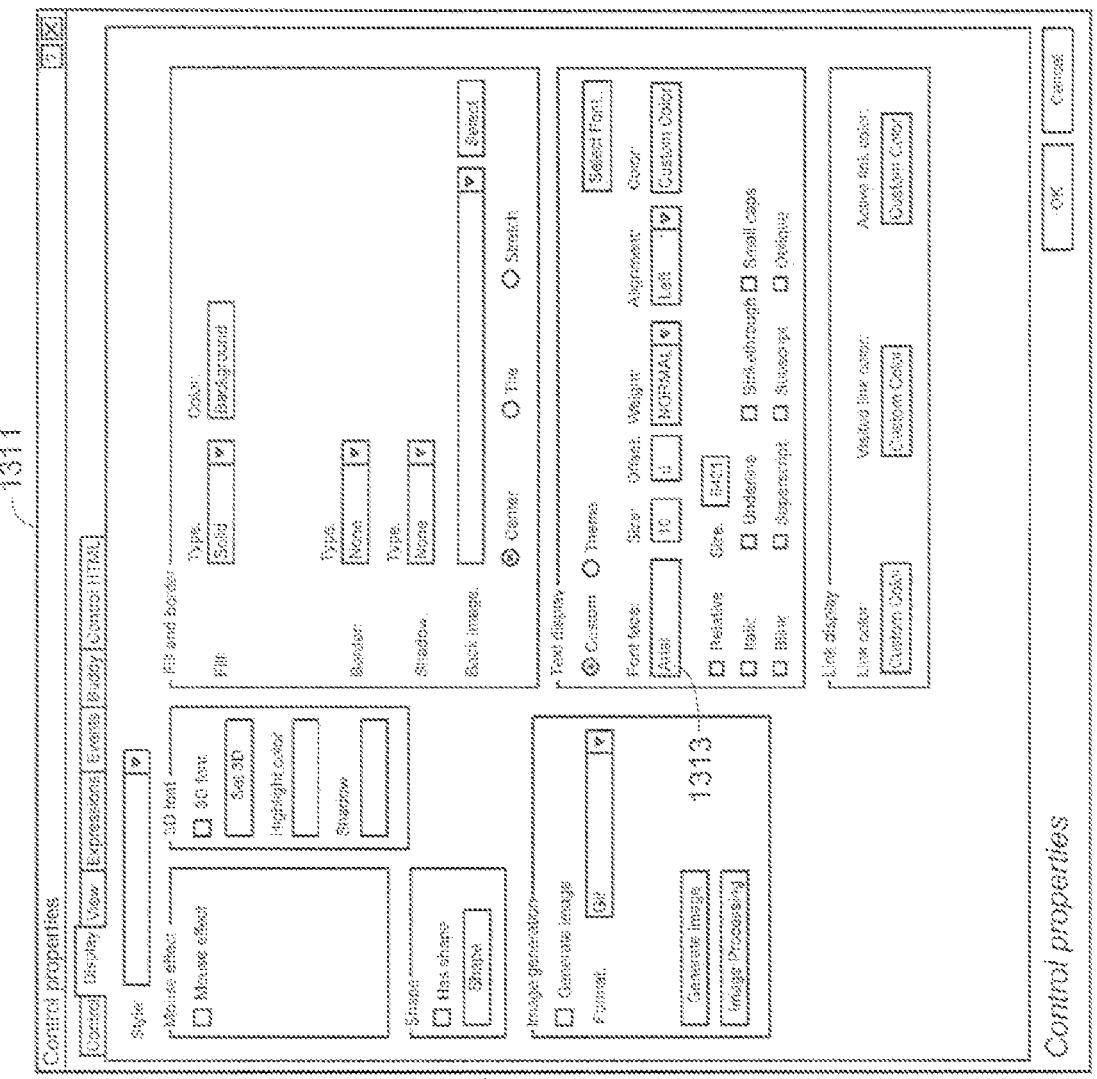
FIG. 13 is a screen rendering of the control property window of the present invention.

With reference to FIG. 13, there is illustrated the control property editor of the present invention. Invoked by the selection of an element placed in web page space 915 of FIG. 9, control property window 1311 allows for the entering of attributes which define the appearance and operation of an element. For example, control property window 1311 is comprised in part of exemplary entry field 1313 into which a font type is entered. The present invention is drawn broadly to any and all assemblages of entry fields or other data entry elements through which the appearance and operation of any and all types of graphic or textual elements may be defined.

Figure 14:
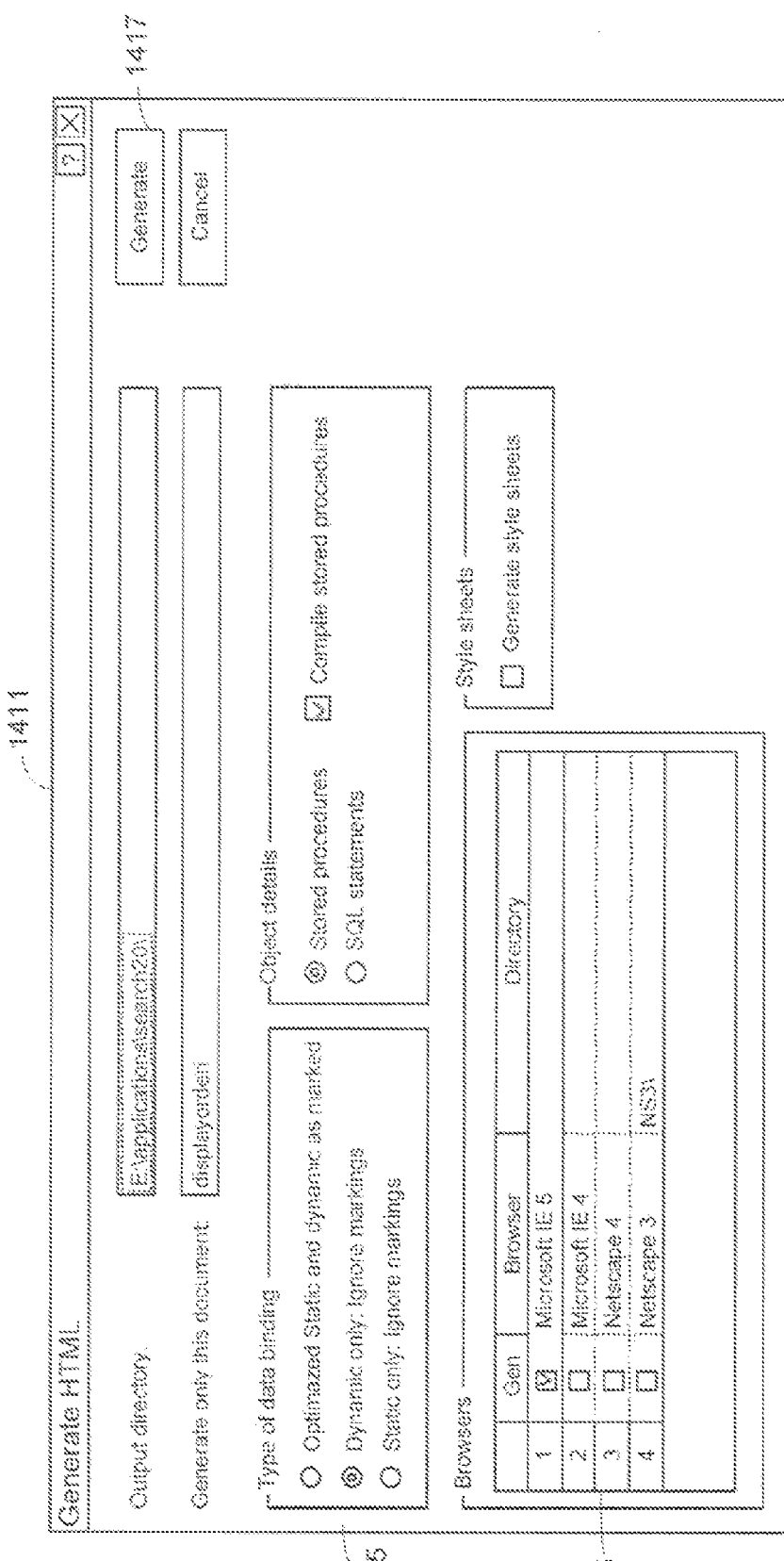
FIG. 14 is a screen rendering of the generate HTML window of the present invention.
Figure 15:
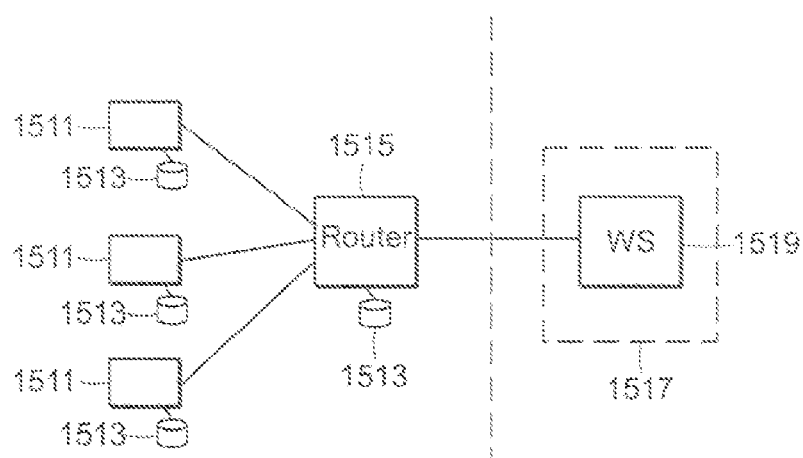
FIG. 15 is a schematic diagram of a traditional network architecture supporting web-based data acquisition as known in the prior art.

Once the attributes of the web page and each element of the web page have been defined, the code for each web page may be generated. With reference to FIG. 14, there is illustrated generate HTML window 1411. While illustrated with reference to generating HTML code, the present invention is drawn broadly to the generation of any and all web based programming languages. Generate HTML window 1411 includes data binding selection 1415 and target browser 1413. Once the method of data binding is selected through the use of target browser 1413, clicking on generate button 1417 will cause the web pages defined by the present invention to be generated into run-time code reflecting the defined appearance and functionality of the web pages so defined.

Figure 17:
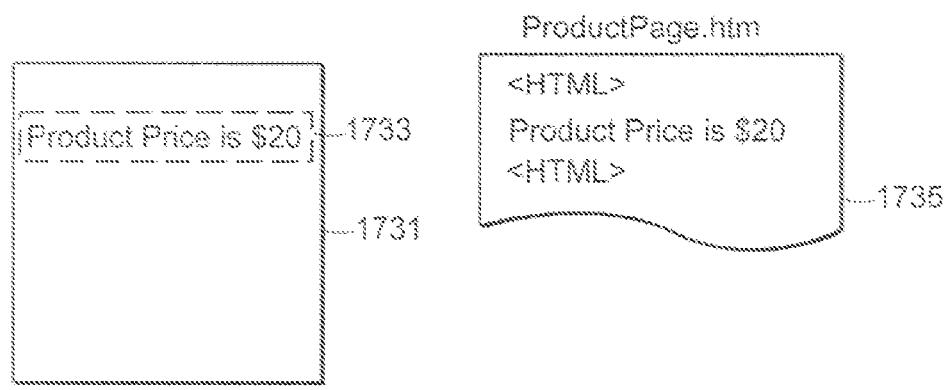
FIG. 17 is a graphic illustration of a static web page and the code that defines the static web page as known from the prior art.

With reference to FIG. 17, there is illustrated a typical web page 1731 as known from the prior art. The HTML code which defines web page 1731 is presented in HTML code 1735. When HTML code 1735 is returned to and displayed by a web browser 1511, the resulting web page 1731 comprises the text 1733. In the present example, web page 1731 was most probably requested form a previous web page (not shown). The request explicitly requested the retrieval of HTML code 1735 by its file name "ProductPage.htm." When this request is received by web server 1519, the page named "ProductPage.htm" is retrieved and sent to web browser 1511 where the browser interprets HTML code 1735 and displays it as web page 1731. The Object Modeler of the present invention allows for the detailed specification of Web Pages. Each Web Page may be defined as being static or dynamic in nature. When the code generation utility of the present invention is invoked to create a page which is static in nature, the exemplary resulting HTLM code 35 is produced. This code is illustrated as follows:

```
<HTML>
Product Price is $20
<HTML>
```

Figure 16:
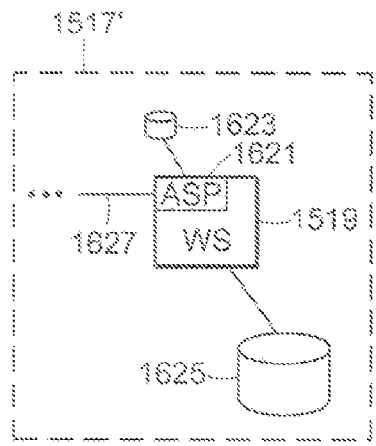
FIG. 16 is a schematic diagram of a web server component as known from the prior art.
Figure 18:
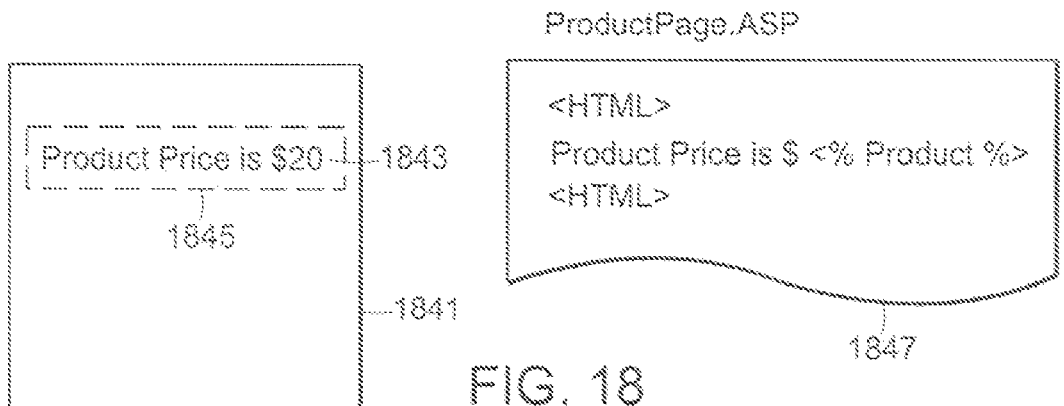
FIG. 18 is a graphic illustration of a dynamic web page and the code that defines the dynamic web page as known from the prior art.
Figure 19:
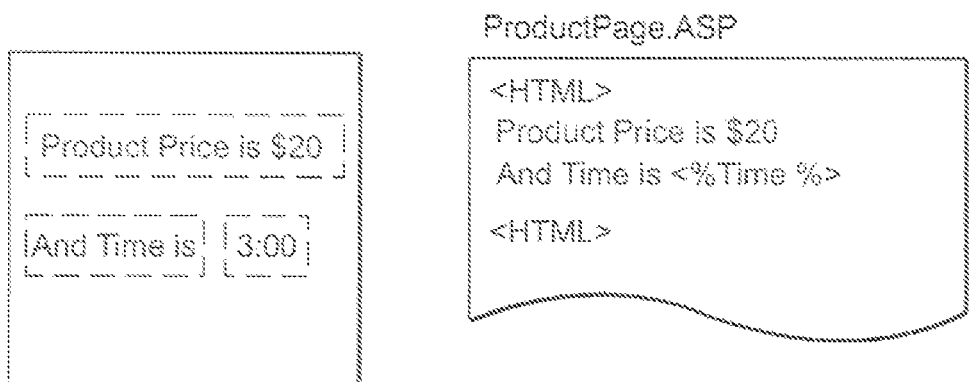
FIG. 19 is a graphic illustration of a dynamic web page comprised of state and dynamic elements and the code which defines the dynamic web page in accordance with the invention.

Alternatively, if a Web Page is defined that comprises at least one dynamic element requiring access to relational database 1625, the resulting code will most likely be in ASP format. With reference to FIG. 18, there is illustrated the identical display of web page 1731 from FIG. 17 shown as web page 1841. While web page 1731 and web page 1841 appear within web browser 1511 as identical, the manner in which the code is retrieved to display either web page 1731 or web page 1841 is different. With respect to web page 1731, HTML code 1735 was requested by name and the corresponding HTML code was returned. With reference to web page 1841, the invocation of ASP code was requested. The ASP code, illustrated as ASP code 1847 was executed on web server 1519, as illustrated in FIG. 16, and produced HTML code identical to the HTML code 1735 of FIG. 17 on executable repository 1623, as illustrated in FIG. 16. Referring again to FIG. 18, this HTML code was sent back to the requesting web browser 1511 and displayed as web page 1841. Although not noticeable to a viewer, web page 1841 is illustrated as incorporating both static elements 1845 and dynamic element 1843. Dynamic element 1843 was retrieved from operational database 1625 and incorporated into the HTML code to be returned to web browser 1511. This process of incorporation is described more fully below.

Examining the generated ASP code 47, it can be seen that, when executed, the ASP code 47 will output directly to executable repository 23 the following code:

```
<HTML>
Product Price is $
```

At this point, the presence of delimiters "<%" and "%>" indicates the requirement to perform the function "Product" whose code is not portrayed. While such delimiters are native to ASP, any method whereby dynamic code is identified for execution may be employed. When completed, the "Product" function (not shown) will have accessed and retrieved the desired product price and outputted the result, in this case "20", to executable repository 1623. Finally the code "<HTML>" will be outputted to executable repository 1623 and the completed HTML file will be sent back to the requesting web browser 1511.

It is therefore seen that from a user's perspective, it is not discernable whether the web page was requested as static HTML code or was assembled by executable 1621 through the execution of ASP code which assembled the requested HTML code. However, it is one aspect of the present invention that, in addition to defining a Web Page as static or dynamic, a web page may be defined as being quasi-static. That is to say, the Web Page contains at least one dynamic element but the rate at which the dynamic data changes is either slow or may be well defined.

Figure 20:
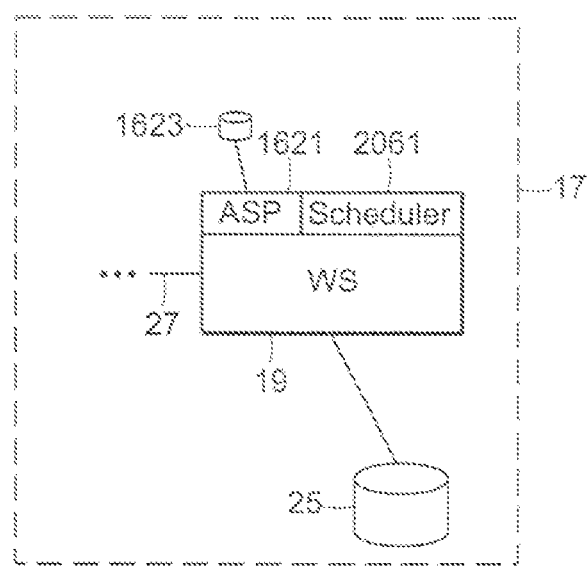
FIG. 20 is a schematic diagram of the web server component of the present invention.

In such an instance, the present invention generates two complementary pieces of code. With reference to FIG. 20, there is illustrated the interaction of these two pieces of code. The first piece of code is executable 1621. The second piece of code, located within web server 1519 is scheduler code 2061. Scheduler code 2061 is generated code which contains information on which executables are to be executed and how often. While illustrated as a flat file containing information regarding executables and the schedule on which they are to be invoked, the present invention is drawn broadly to any method whereby such scheduling information may be stored and retrieved including, but not limited to, the use of a relational database. Scheduler code 2061 is typically accessed by a long running executable which continually queries the system time of the platform on which it resides. When the time interval since the last scheduled update of an executable defined in scheduler code 2061 has elapsed, the long running executable invokes the execution of the required executable. In this manner, executables 1621 such as those comprised of ASP code, are executed on a desired basis with the resulting static HTML pages stored on executable repository 1623. In fact, the static HTML pages may be stored anywhere on web server component 1517 that possesses connectivity to web server 1519.

In addition to generating the code for executable 1621 and scheduler 2061, the code invoked by web pages to access an HTML page which is periodically updated by scheduler 2061 invoking an executable 1621 is generated to request a static HTML page. In this manner, a Web Page containing dynamic elements, is requested as a static Web Page. It is one aspect of the present invention to define web pages as associated with a specific Business Class definition. Because the logical connections between Business Classes, and hence web pages, are defined when a web page containing dynamic elements is defined as static, the code of other web pages which might access the static defined web page may be automatically generated to request a static web page. When the request for the static Web Page is received by the web server 1519, web server 1519 retrieves the most recently generated HTML code which satisfies the request and returns it to the requesting web browser 1511.

What is claimed is:

1. A method for providing a requestor with access to dynamic data via quasi-static data requests, comprising the steps of:
    (a) defining a web page, said web page including at least one dynamic element and being associated with at least one Business Class definition;
    (b) creating an executable digital code to be run on a computer and invoked at defined intervals by a scheduler component, said executable code effective to create and store a quasi-static copy of said defined web page;
    (c) creating said scheduler component capable of invoking said executable code at predefined intervals;
    (d) loading said executable component and said scheduler component onto a platform in connectivity with a web server and with one another;
    (e) invoking execution of said scheduler component; and
    (f) retrieving and returning said quasi-static copy of said defined web page in response to requests for said defined web page;
        wherein the creation of said executable code and the creation of the scheduler component are generated from attributes and processes of the Business Class definitions associated with said defined web page.

2. The method of claim 1 wherein said web page is defined and stored in a centralized repository.

3. The method of claim 2 wherein defining said web page comprises the steps of:
    defining the placement and method of derivation for all elements comprising said web page; and
    defining said web page as either static or dynamic in nature.

4. The method of claim 3 wherein said elements are defined as dynamic or static in nature.

5. A method as claimed in claim 4 wherein said static copy of said defined web page is stored in a format capable of being viewed by a web browser.

6. A method for providing a requestor with access to dynamic data via quasi-static data requests, comprising the steps of:
    modeling business activities as interactions and relationships between a plurality of business classes, the business classes including attributes and processes corresponding to data elements of the business activities;
    defining a web page including at least one element containing dynamic data;
    associating at least one attribute or process of the business classes with the at least one element containing dynamic data;
    periodically invoking an executable to generate a static copy of the defined web page based on the at least one attribute or process associated with the at least one element containing dynamic data; and
    upon receiving a request for the defined web page from the requestor, returning the generated static copy of the web page, as already generated by the periodically invoked executable, instead of dynamically generating the defined web page.

7. The method of claim 6 wherein the at least one element is retrieved from an operational database by the executable when the static copy of the web page is generated.

8. The method of claim 6 wherein the executable is written in Active Server Pages (ASP).

9. The method of claim 6 wherein the quasistatic copy of the web page is stored in a format capable of being viewed by a web browser.

* * * * *